(12) United States Patent
Yamashima et al.

(10) Patent No.: US 10,735,349 B2
(45) Date of Patent: Aug. 4, 2020

(54) NON-TRANSITORY COMPUTER-READABLE STORAGE MEDIUM, PACKET CONTROL METHOD, AND PACKET CONTROL DEVICE

(71) Applicant: FUJITSU LIMITED, Kawasaki-shi, Kanagawa (JP)

(72) Inventors: Hiroyuki Yamashima, Kawasaki (JP); Kazuhiro Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 33 days.

(21) Appl. No.: 16/178,652

(22) Filed: Nov. 2, 2018

(65) Prior Publication Data
US 2019/0140980 A1  May 9, 2019

(30) Foreign Application Priority Data
Nov. 7, 2017  (JP) .................. 2017-214539

(51) Int. Cl.
H04L 12/28   (2006.01)
H04L 12/931  (2013.01)
H04L 12/851  (2013.01)
H04L 12/823  (2013.01)

(52) U.S. Cl.
CPC ............ H04L 49/208 (2013.01); H04L 47/24 (2013.01); H04L 47/323 (2013.01); H04L 49/354 (2013.01); H04L 49/70 (2013.01)

(58) Field of Classification Search
CPC ....... H04L 12/18; H04L 12/185; H04L 45/16; H04L 49/201
See application file for complete search history.

(56) References Cited

U.S. PATENT DOCUMENTS

| 7,636,320 | B1* | 12/2009 | Taylor | H04L 41/0631 370/229 |
| 2002/0131369 | A1 | 9/2002 | Hasegawa et al. | |
| 2003/0120795 | A1* | 6/2003 | Reinshmidt | H04L 47/20 709/232 |
| 2012/0188874 | A1* | 7/2012 | Kumagai | H04L 47/2441 370/235 |
| 2013/0051225 | A1* | 2/2013 | Pullen | H04L 12/2801 370/230 |

FOREIGN PATENT DOCUMENTS

| JP | 2002-281086 | 9/2002 |
| JP | 2008-085694 | 4/2008 |
| JP | 2012-004781 | 1/2012 |

* cited by examiner

Primary Examiner — Siren Wei
(74) Attorney, Agent, or Firm — Fujitsu Patent Center

(57) ABSTRACT

A non-transitory computer-readable storage medium storing a program that causes a computer to execute a process, the process including writing, to a memory, a packet obtained by copying a packet being transmitted, reading, from the memory, the packet to be transferred to a device that diagnoses a communication state, selecting, from packets stored in the memory, one or more packets subjected to at least one of a connection procedure and a disconnection procedure in a predetermined protocol, and discarding, from the memory, one or more packets other than the one or more selected packets.

7 Claims, 43 Drawing Sheets

FIG. 13

| CONNECTION ID | SOURCE IP ADDRESS | DESTINATION IP ADDRESS | PROTOCOL | SOURCE PORT NUMBER | DESTINATION PORT NUMBER | NUMBER OF PACKETS | NON-TRANSFERRED PACKET AMOUNT (BYTES) |
|---|---|---|---|---|---|---|---|
| C1 | IP-1 | IP-2 | TCP | 1000 | 2000 | 3500 | 5000000 |
| C2 | IP-2 | IP-1 | TCP | 2000 | 1000 | 1500 | 1200000 |
| C3 | IP-1 | IP-3 | TCP | 3000 | 4000 | 250 | 350000 |
| C4 | IP-3 | IP-1 | TCP | 4000 | 3000 | 300 | 100000 |
| C5 | IP-1 | IP-4 | UDP | 5000 | 6000 | 450 | 600000 |

FIG. 15

| CONNECTION ID | RATIO OF NUMBER OF PACKETS (%) | RATIO OF NON-TRANSFERRED PACKET AMOUNT (%) | AVERAGE PACKET SIZE (BYTES) | TARGET REDUCTION AMOUNT (BYTES) |
|---|---|---|---|---|
| C1 | 60 | 70 | 1428 | 1575000 |
| C2 | 25 | 15 | 800 | 337500 |
| C3 | 4 | 5 | 1400 | 112500 |
| C4 | 4 | 1 | 333 | 22500 |
| C5 | 6 | 8 | 1333 | 180000 |

FIG. 18

| CONNECTION ID | BACKWARD CONNECTION | DISCARDED AMOUNT (BYTES) | COUNTER | DECIMATION INTERVAL |
|---|---|---|---|---|
| C1 | C2 | 0 | 0 | 3 |
| C2 | C1 | 0 | 0 | 3 |
| C3 | C4 | 0 | 0 | 3 |
| C4 | C3 | 0 | 0 | 4 |
| C5 | NOT SET | 0 | 0 | 3 |

| DISCARDED PACKET | | DISCARDED PACKET | | |
|---|---|---|---|---|
| SEQUENCE NUMBER | DATA SIZE | SEQUENCE NUMBER | DATA SIZE | ... |
| NOT SET | NOT SET | NOT SET | NOT SET | ... |
| NOT SET | NOT SET | NOT SET | NOT SET | ... |
| NOT SET | NOT SET | NOT SET | NOT SET | ... |
| NOT SET | NOT SET | NOT SET | NOT SET | ... |
| NOT SET | NOT SET | NOT SET | NOT SET | ... |

| CONTROL PACKET | | CONTROL PACKET | | |
|---|---|---|---|---|
| CONTROL TYPE | SEQUENCE NUMBER | CONTROL TYPE | SEQUENCE NUMBER | ... |
| NOT SET | NOT SET | NOT SET | NOT SET | ... |
| NOT SET | NOT SET | NOT SET | NOT SET | ... |
| NOT SET | NOT SET | NOT SET | NOT SET | ... |
| NOT SET | NOT SET | NOT SET | NOT SET | ... |
| NOT SET | NOT SET | NOT SET | NOT SET | ... |

FIG. 32

| NON-TRANSFER REQUIREMENT | PROTOCOL IS ICMP |
|---|---|
| NON-DISCARDING REQUIREMENT | IP ADDRESS OF COMMUNICATION DESTINATION IS IP-3 |
| DISCARDING REQUIREMENT | IP ADDRESS OF COMMUNICATION DESTINATION IS IP-2 OR IP-4 |

FIG. 36

| CONNECTION ID | SOURCE IP ADDRESS | DESTINATION IP ADDRESS | PROTOCOL | SOURCE PORT NUMBER | DESTINATION PORT NUMBER | NUMBER OF PACKETS | NON-TRANSFERRED PACKET AMOUNT (BYTES) | EXCLUSION FLAG |
|---|---|---|---|---|---|---|---|---|
| C1 | IP-1 | IP-2 | TCP | 1000 | 2000 | 3500 | 5000000 | OFF |
| C2 | IP-2 | IP-1 | TCP | 2000 | 1000 | 1500 | 1200000 | OFF |
| C3 | IP-1 | IP-3 | TCP | 3000 | 4000 | 250 | 350000 | ON |
| C4 | IP-3 | IP-1 | TCP | 4000 | 3000 | 300 | 100000 | ON |
| C5 | IP-1 | IP-4 | UDP | 5000 | 6000 | 450 | 600000 | OFF |

FIG. 41

| CONNECTION ID | RATIO OF NUMBER OF PACKETS (%) | RATIO OF NON-TRANSFERRED PACKET AMOUNT (%) | AVERAGE PACKET SIZE (BYTES) | TARGET REDUCTION AMOUNT (BYTES) |
|---|---|---|---|---|
| C1 | 64 | 73 | 1428 | 1575000 |
| C2 | 28 | 28 | 800 | 337500 |
| C5 | 8 | 9 | 1333 | 180000 |

NON-TRANSITORY COMPUTER-READABLE STORAGE MEDIUM, PACKET CONTROL METHOD, AND PACKET CONTROL DEVICE

CROSS-REFERENCE TO RELATED APPLICATION

This application is based upon and claims the benefit of priority of the prior Japanese Patent Application No. 2017-214539, filed on Nov. 7, 2017, the entire contents of which are incorporated herein by reference.

FIELD

The embodiments discussed herein are related to a non-transitory computer-readable storage medium, a packet control method, and a packet control device.

BACKGROUND

For example, in the case where a packet mirrored by a switch device is transferred to a diagnosing device, and a communication state of a system is diagnosed, bandwidth control may be executed by the switch device based on a communication load in a network.

In the bandwidth control, the packet is temporarily stored in a buffer and output while a bandwidth to be used is suppressed. When the total amount of stored packets increases and exceeds the capacity of the buffer, a packet mirrored after that is randomly lost.

There is an important index to be used for the diagnosing device to accurately diagnose the communication state of the system. For example, like the Transmission Control Protocol (TCP), in a system for communicating data on the premise of a connected state, a connection period is a basic index. The connection period is used for the calculation of an average connection period or the amount of data to be transmitted per connection.

Examples of related art are Japanese Laid-open Patent Publication No. 2002-281086, Japanese Laid-open Patent Publication No. 2008-085694, and Japanese Laid-open Patent Publication No. 2012-004781.

SUMMARY

According to an aspect of the embodiments, a non-transitory computer-readable storage medium storing a program that causes a computer to execute a process, the process including writing, to a memory, a packet obtained by copying a packet being transmitted, reading, from the memory, the packet to be transferred to a device that diagnoses a communication state, selecting, from packets stored in the memory, one or more packets subjected to at least one of a connection procedure and a disconnection procedure in a predetermined protocol, and discarding, from the memory, one or more packets other than the one or more selected packets.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 is a diagram illustrating an example of a connection table;

FIG. 15 is a diagram illustrating an example of a statistics table;

FIG. 18 is a diagram illustrating an example of a control table;

FIG. 32 is a diagram illustrating an example of a requirement table;

FIG. 36 is a diagram illustrating an example of a connection table according to a second embodiment;

FIG. 41 is a diagram illustrating an example of a statistics table according to the second embodiment;

DESCRIPTION OF EMBODIMENTS

According to an aspect, an object of the present disclosure is to inhibit a packet important for diagnosis of a communication state from being lost.

First Embodiment

Figure 1:
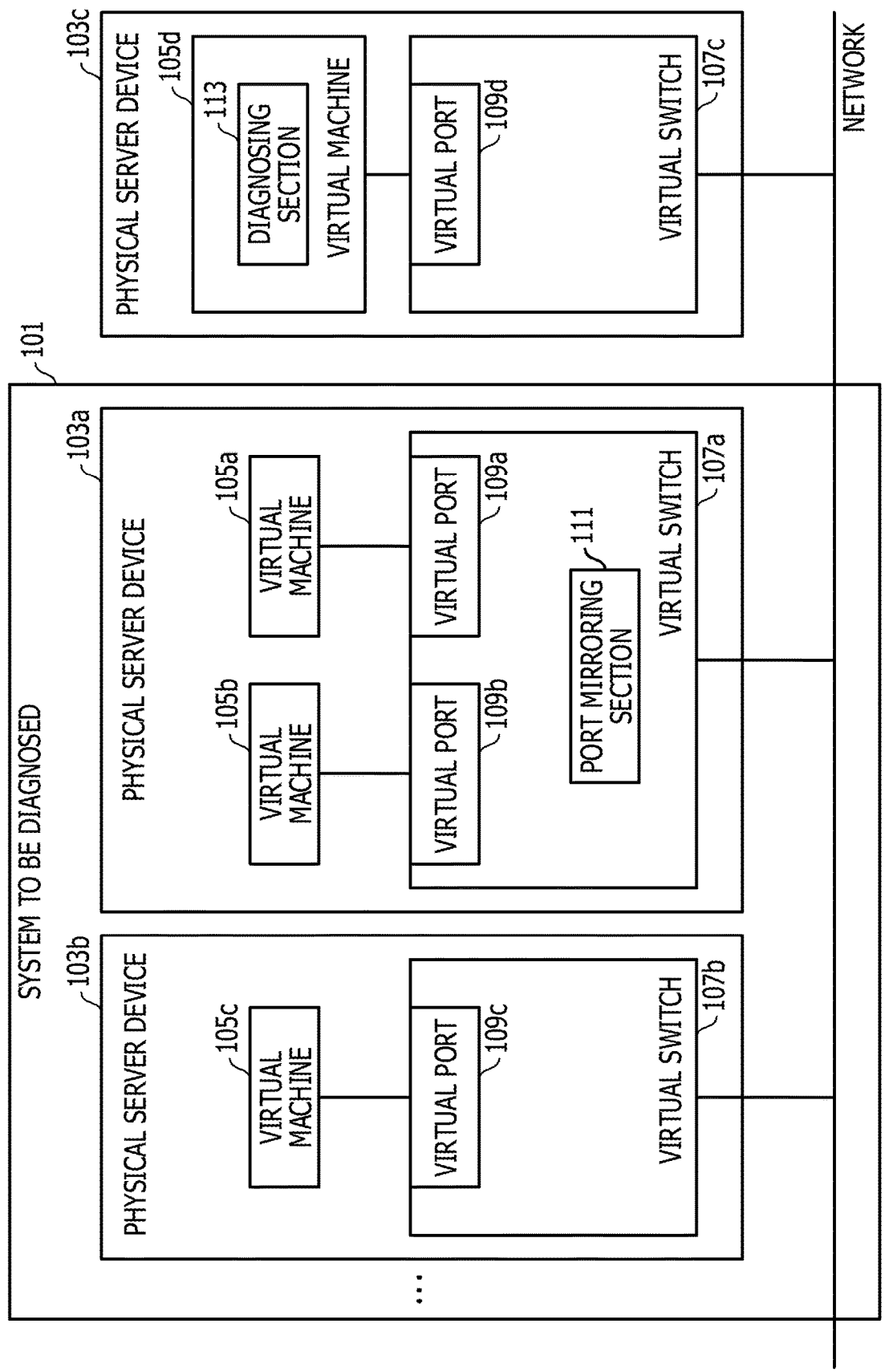
FIG. 1 is a diagram illustrating an example of a configuration of a system.

FIG. 1 illustrates an example of a configuration of a system. A physical server device 103a includes a virtual switch 107a. A physical server device 103b includes a virtual switch 107b. A physical server device 103c includes a virtual switch 107c. A virtual machine 105a is connected to a virtual port 109a of the virtual switch 107a. A virtual machine 105b is connected to a virtual port 109b of the virtual switch 107a. A virtual machine 105c is connected to a virtual port 109c of the virtual switch 107b. A virtual machine 105d is connected to a virtual port 109d of the virtual switch 107c. The virtual switches 107a to 107c are connected to a network. The network is, for example, a local area network (LAN).

For example, in the case where a packet is to be transmitted from the virtual machine 105a to the virtual machine 105b, the packet input to the virtual port 109a from the virtual machine 105a is output from the virtual port 109b and reaches the virtual machine 105b. On the other hand, in the case where a packet is to be transmitted from the virtual machine 105b to the virtual machine 105a, the packet input to the virtual port 109b from the virtual machine 105b is output from the virtual port 109a and reaches the virtual machine 105a.

In the case where a packet is to be transmitted from the virtual machine 105a to the virtual machine 105c, the packet input to the virtual port 109a from the virtual machine 105a is transmitted from the virtual switch 107a via the network to the virtual switch 107b. Then, the packet is output from the virtual port 109c and reaches the virtual machine 105c. On the other hand, in the case where a packet is to be transmitted from the virtual machine 105c to the virtual machine 105a, the packet input to the virtual port 109c from the virtual machine 105c is transmitted from the virtual switch 107b via the network to the virtual switch 107a. Then, the packet is output from the virtual port 109a and reaches the virtual machine 105a.

Packets are transmitted between the other combinations of the virtual machines 105 in the same manner as described above. The system 101 to be diagnosed in this example includes the physical server devices 103a and 103b, the virtual machines 105a to 105c included in the physical server devices 103a and 103b, the virtual switches 107a and 107b, and the like.

A diagnosing section 113 included in the virtual machine 105d diagnoses states of data transmission between the virtual machines 105a, 105b, and 105c included in the system 101 to be diagnosed. The case where packets that have passed through the virtual port 109a are monitored is described below. The port mirroring section 111 mirrors packets having passed through the virtual port 109a and transfers the copied packets to the diagnosing section 113.

The diagnosing section 113 analyzes the packets received from the port mirroring section 111. Specifically, the diagnosing section 113 executes L4 (the forth layer of the Open Systems Interconnection (OSI) reference model or the transport layer) diagnosis or L7 (the seventh layer of the OSI reference model or the application layer) diagnosis.

In this case, a transmission load in the network increases due to the transfer of the packets from the port mirroring section 111 to the diagnosing section 113. To reduce the transmission load, the port mirroring section 111 executes Quality of Service (QoS) control or specifically executes bandwidth control.

Thus, the port mirroring section 111 temporarily stores the packets copied by the mirroring in a buffer and outputs the packets so that a bandwidth to be used does not exceed a standard value. Thus, when the total amount of the stored packets reaches an upper limit, a packet with an amount in excess of the upper limit is discarded.

In the first embodiment, the port mirroring section 111 executes control so that a packet important for the L4 diagnosis by the diagnosing section 113 is not discarded. In the L7 diagnosis, a packet is discarded by normal bandwidth control. This is due to the fact that the diagnosing section 113 does not execute the L7 diagnosis on a set of discontinuous packets.

Figure 2:
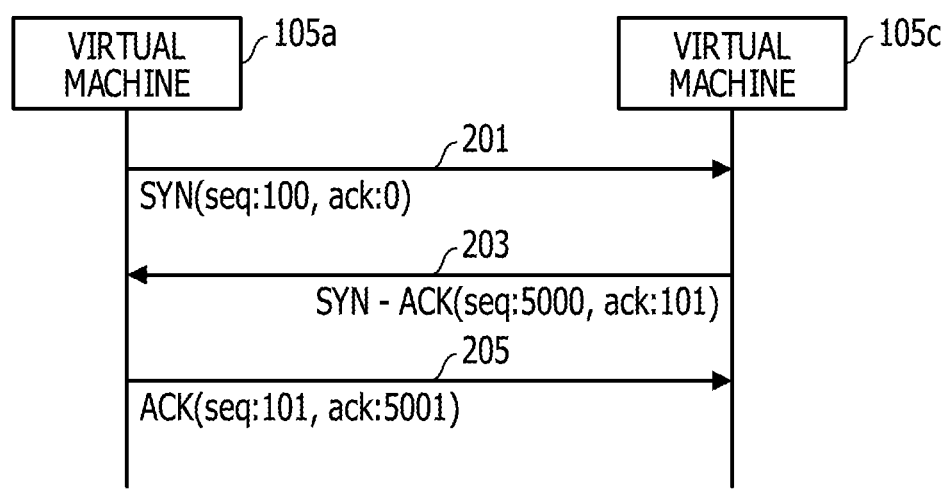
FIG. 2 is a diagram illustrating an example of a connection sequence in the TCP.

An example of a packet to be excluded from packets to be discarded is described below. FIG. 2 illustrates a connection sequence in the TCP. A TCP connection is established by 3-way handshake. In the example illustrated in FIG. 2, the virtual machine 105a requests the virtual machine 105c to establish a TCP connection.

In this example, first, the virtual machine 105a transmits a SYN packet 201 to the virtual machine 105c. In the SYN packet 201, a SYN flag that is one of control flags included in a TCP header indicates ON, and the other control flags indicate OFF. This example assumes that a sequence number of the SYN packet 201 is 100.

After the virtual machine 105c receives the SYN packet 201, the virtual machine 105c transmits a SYN-ACK packet 203 to the virtual machine 105a. In the SYN-ACK packet 203, a SYN flag and an ACK flag that is one of control flags indicate ON, and the other control flags indicate OFF. An ACK number (acknowledgement number) of the SYN-ACK packet 203 is 101, which is obtained by adding 1 to 100 that is the sequence number of the SYN packet 201. This example assumes that a sequence number of the SYN-ACK packet 203 is 5000.

After the virtual machine 105a receives the SYN-ACK packet 203, the virtual machine 105a transmits an ACK packet 205 to the virtual machine 105c. In the ACK packet 205, an ACK flag indicates ON, and other control flags indicate OFF. An ACK number of the ACK packet 205 is 5001, which is obtained by adding 1 to 5000 that is the sequence number of the SYN-ACK packet 203.

As described above, a correspondence relationship between a previously transmitted packet and a response packet to the previously transmitted packet is identified based on a sequence number of the previously transmitted packet and an ACK number of the response packet.

The port mirroring section 111 according to the first embodiment excludes the series of control packets transmitted in a procedure for a TCP connection or the SYN packet 201, the SYN-ACK packet 203, and the ACK packet 205 from packets to be discarded. When the diagnosing section 113 receives the series of control packets, the diagnosing section 113 may treat the TCP connection as an event.

Next, a packet to be transmitted during a TCP connection is described. During the TCP connection, communication is executed mainly for the purpose of data transmission. Actual data to be transmitted is transmitted as body data of a TCP packet.

Figure 3:
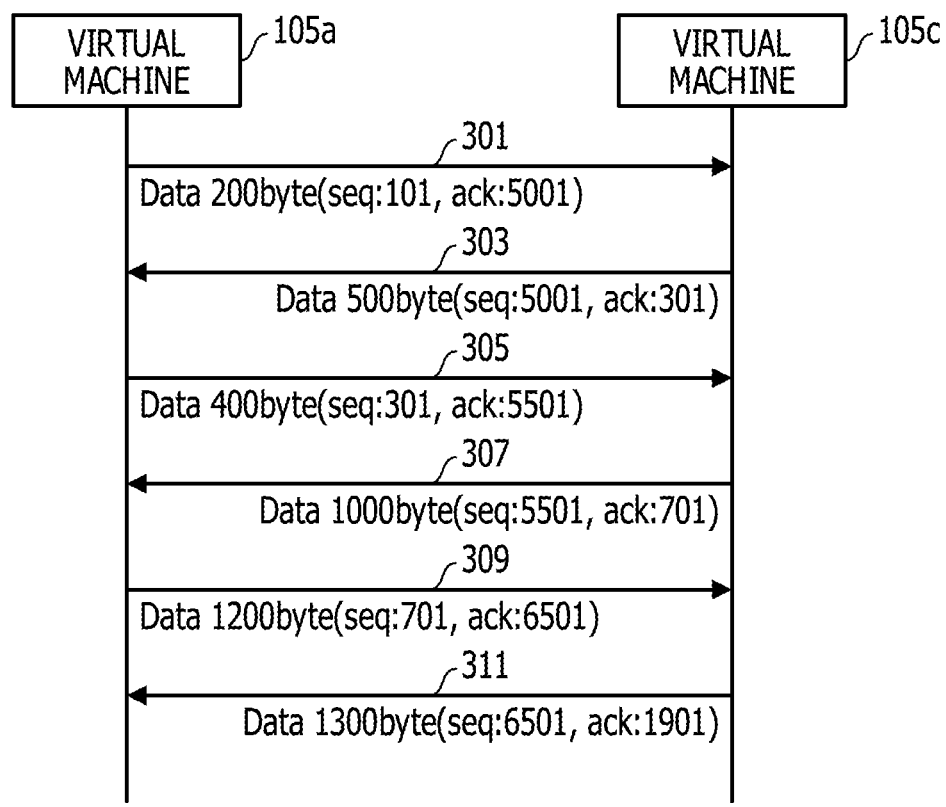
FIG. 3 is a diagram illustrating an example of a sequence of data transmission in the TCP.

FIG. 3 illustrates an example of a sequence of data transmission in the TCP. In the example illustrated in FIG. 3, the virtual machines 105a and 105c alternately transmit data. Each of packets 301 to 311 includes body data. For example, the size of the body data of the packet 301 transmitted from the virtual machine 105a to the virtual machine 105c is 200 bytes. A sequence number of the packet 301 is 101. In each of the packets 301 to 311, an ACK flag indicates ON, and other control flags indicate OFF.

For example, the packet 303 transmitted from the virtual machine 105c to the virtual machine 105a carries body data of 500 bytes and is a response to the packet 301. An ACK number of the packet 303 is 301 which is obtained by adding 101 that is the sequence number of the packet 301 to 200 that is the size of the body data of the packet 301 serving as a basic packet. The same applies to a relationship between the packets 303 and 305, a relationship between the packets 305 and 307, a relationship between the packets 307 and 309, and a relationship between the packets 309 and 311.

As described above, a correspondence relationship between a previously transmitted packet and a response packet to the previously transmitted packet is identified by the sum of the size of body data of the previously transmitted packet and a sequence number of the previously transmitted packet and an ACK number of the response packet.

When the previously transmitted packet is to be discarded, the port mirroring section 111 according to the first embodiment sets the response packet to the previously transmitted packet to a packet that is not to be discarded. Thus, the diagnosing section 113 may easily capture an event of transmitted data. When information on the previously transmitted packet and the response packet to the previously transmitted packet is not obtained, the diagnosing section 113 does not easily capture the event of the transmitted data.

Figure 4:
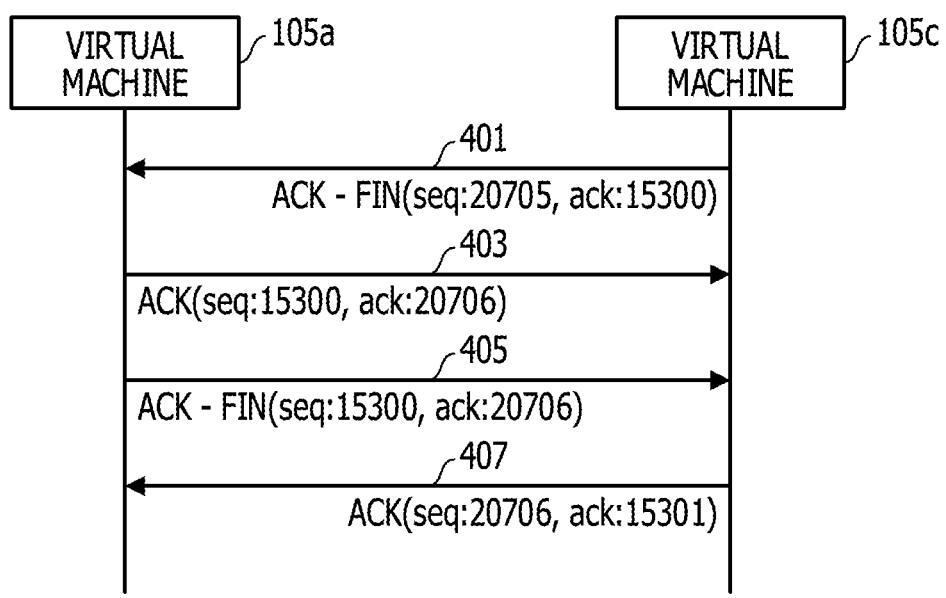
FIG. 4 is a diagram illustrating an example of a disconnection sequence in the TCP.

FIG. 4 illustrates an example of a disconnection sequence in the TCP. In the TCP, a disconnection procedure is started when one of devices requests the other of the devices to terminate a connection.

In this example, first, the virtual machine 105c transmits an ACK-FIN packet 401 to the virtual machine 105a. In the ACK-FIN packet 401, an ACK flag and a FIN flag that is one of control flags indicate ON, and the other control flags indicate OFF. This example assumes that a sequence number of the ACK-FIN packet 401 is 20705.

After the virtual machine 105a receives the ACK-FIN packet 401, the virtual machine 105a transmits an ACK packet 403 to the virtual machine 105c. An ACK number of the ACK packet 403 is 20706, which is obtained by adding 1 to 20705 that is the sequence number of the ACK-FIN packet 401.

The virtual machine 105a subsequently transmits an ACK-FIN packet 405 to the virtual machine 105c. This example assumes that a sequence number of the ACK-FIN packet 405 is 15300.

After the virtual machine 105c receives the ACK-FIN packet 405, the virtual machine 105c transmits an ACK packet 407 to the virtual machine 105a. An ACK number of the ACK packet 407 is 15301, which is obtained by adding 1 to 15300 that is the sequence number of the ACK-FIN packet 405.

In this manner, in the disconnection sequence, a correspondence relationship between a previously transmitted ACK-FIN packet and an ACK packet that is a response to the previously transmitted ACK-FIN packet is identified by a sequence number of the previously transmitted ACK-FIN packet and an ACK number of the ACK packet that is the response to the previously transmitted ACK-FIN packet.

The port mirroring section 111 according to the first embodiment excludes the series of control packets transmitted in a procedure for a TCP disconnection or the ACK-FIN packet 401, the ACK packet 403, the ACK-FIN packet 405, and the ACK packet 407 from packets to be discarded. When the diagnosing section 113 receives the series of control packets, the diagnosing section 113 may treat the TCP disconnection as an event.

Figure 5:
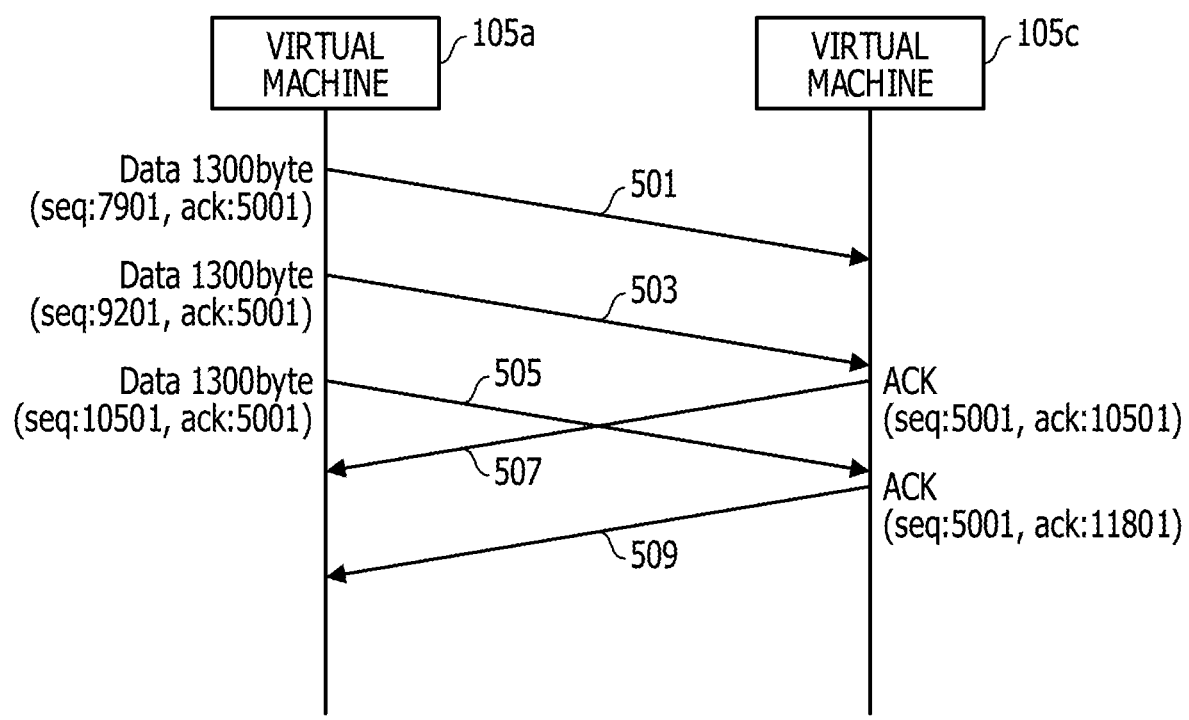
FIG. 5 is a diagram illustrating another example of the sequence of the data transmission in the TCP.

In a case other than the example illustrated in FIG. 3, packets to be used for data transmission may be continuously output. FIG. 5 illustrates another example of the sequence of the data transmission in the TCP.

In this example, the virtual machine 105a continuously outputs packets 501, 503, and 505, each of which includes body data. Destinations of the packets 501 to 505 are the virtual machine 105c. The size of the body data of the packet 501 is 1300 bytes, and a sequence number of the packet 501 is 7901. The size of the body data of the packet 503 is 1300 bytes. A sequence number of the packet 503 is 9201. The size of the body data of the packet 505 is 1300 bytes, and a sequence number of the packet 505 is 10501.

The virtual machine 105c transmits an ACK packet 507 to the virtual machine 105a upon completely receiving the packets 501 and 503. An ACK number of the ACK packet 507 is 10501, which is obtained by adding 9201 that is the sequence number of the later received packet 503 to 1300 that is the size of the body data of the later received packet 503.

After that, the virtual machine 105c transmits an ACK packet 509 to the virtual machine 105a upon completely receiving the packet 505. An ACK number of the ACK packet 509 is 11801, which is obtained by 10501 that is the sequence number of the received packet 505 to 1300 that is the size of the body data of the received packet 505.

When the port mirroring section 111 according to the first embodiment treats the packet 503 as a packet to be discarded, the port mirroring section 111 does not treat the ACK packet 507 as a packet to be discarded. Since the ACK number of the ACK packet 507 matches the sum of the size of the body data of the packet 503 and the sequence number of the packet 503, a correspondence relationship between the packets 503 and 507 is identified.

When the port mirroring section 111 treats the packet 501 as a packet to be discarded, the port mirroring section 111 does not treat the ACK packet 507 as a packet to be discarded. Since the ACK number of the ACK packet 507 is larger than the sum of the size of the body data of the packet 501 and the sequence number of the packet 501, a correspondence relationship between the packets 501 and 507 is identified.

When the sum of the size of body data of a packet to be discarded and a sequence number of the packet to be discarded is compared with an ACK number of an ACK packet, whether or not the ACK packet is to be excluded from packets to be discarded may be determined.

In the example illustrated in FIG. 5, when the port mirroring section 111 treats the packet 505 as a packet to be discarded, the port mirroring section 111 does not treat the ACK packet 509 as a packet to be discarded. The description of the overview of the first embodiment is finished.

Figure 6:
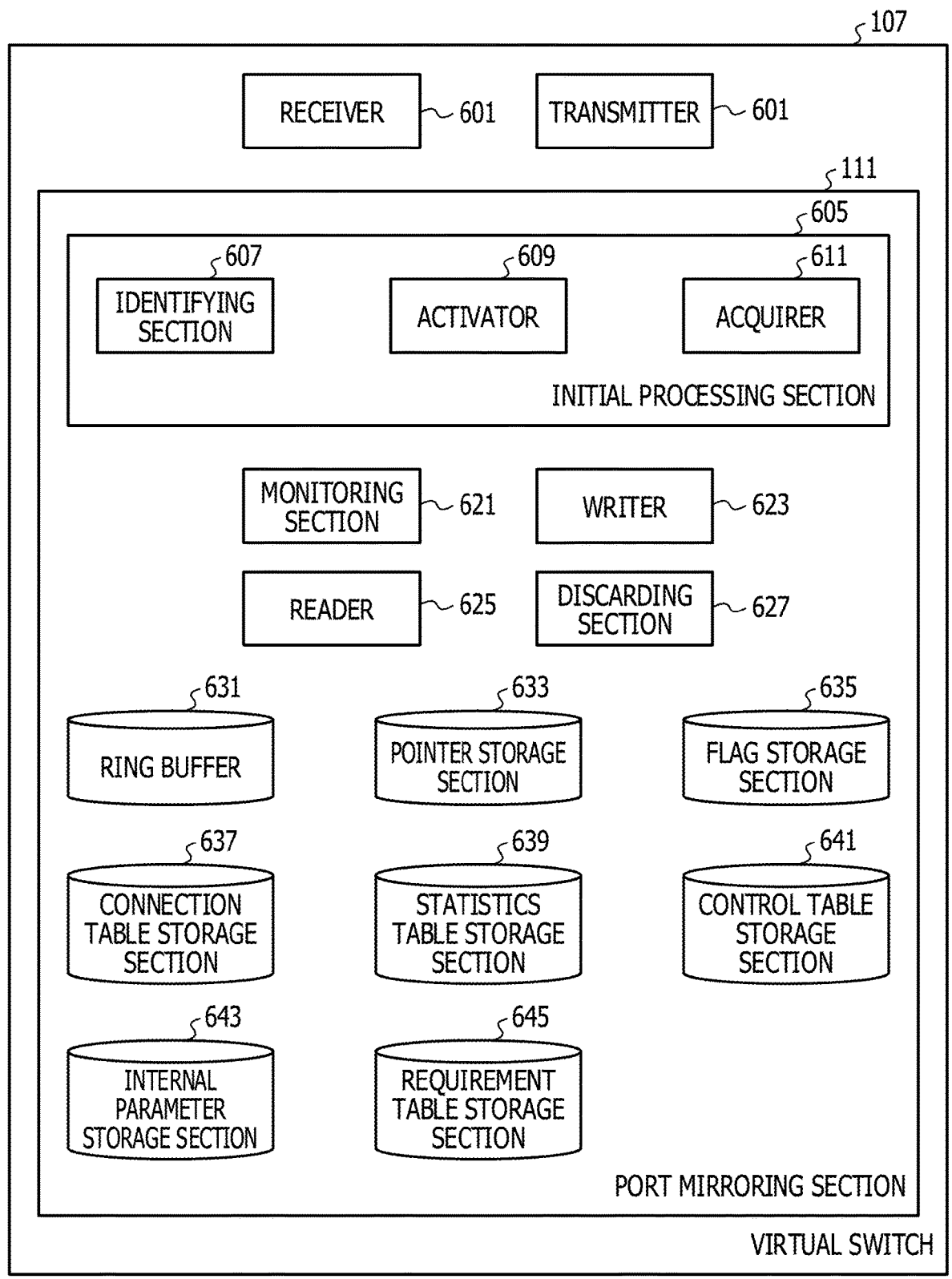
FIG. 6 is a diagram illustrating an example of a module configuration of a virtual switch.

Operations of each of the virtual switches 107 are described below. FIG. 6 illustrates an example of a module configuration of the virtual switch 107. The virtual switch 107 includes a receiver 601, a transmitter 603, and a port mirroring section 111. The receiver 601 receives various types of data. The transmitter 603 transmits various types of data.

The port mirroring section 111 includes an initial processing section 605, a monitoring section 621, a writer 623, a reader 625, and a discarding section 627. The initial processing section 605 executes initial processes. The initial processing section 605 includes an identifying section 607, an activator 609, and an acquirer 611. The identifying section 607 identifies a virtual port 109 (hereinafter referred to as target port) to be monitored. The activator 609 activates various processes. The acquirer 611 acquires a diagnosis type from the diagnosing section 113. In a second embodiment, the acquirer 611 acquires a requirement table from the diagnosing section 113.

The monitoring section 621 executes a monitoring process. The monitoring process is described later in detail. The writer 623 executes writing processes. The writing processes are described later in detail. The reader 625 executes a reading process. The reading process is described later in detail. The discarding section 627 executes discarding processes. The discarding processes are described later in detail.

The port mirroring section 111 also includes a ring buffer 631, a pointer storage section 633, a flag storage section 635, a connection table storage section 637, a statistics table storage section 639, a control table storage section 641, an internal parameter storage section 643, and a requirement table storage section 645.

The ring buffer 631 includes multiple regions for storing packets. The ring buffer 631 is described later with reference to FIG. 10. The pointer storage section 633 stores a write pointer and a read pointer. The flag storage section 635 stores invalidity flags. The invalidity flags are described later with reference to FIG. 10. The connection table storage section 637 stores a connection table. The connection table is described later with reference to FIG. 13. The statistics table storage section 639 stores a statistics table. The statistics table is described later with reference to FIG. 15. The control table storage section 641 stores a control table. The control table is described later with reference to FIG. 18. The internal parameter storage section 643 stores various internal parameters. The requirement table storage section 645 stores the requirement table. The requirement table is described later with reference to FIG. 32 in the second embodiment.

The receiver 601, the transmitter 603, the initial processing section 605, the identifying section 607, the activator 609, the acquirer 611, the monitoring section 621, the writer 623, the reader 625, and the discarding section 627 are enabled using hardware resources (for example, hardware resources illustrated in FIG. 43) and a program for causing a central processing unit (CPU) 2503 to execute processes described later.

Figure 43:
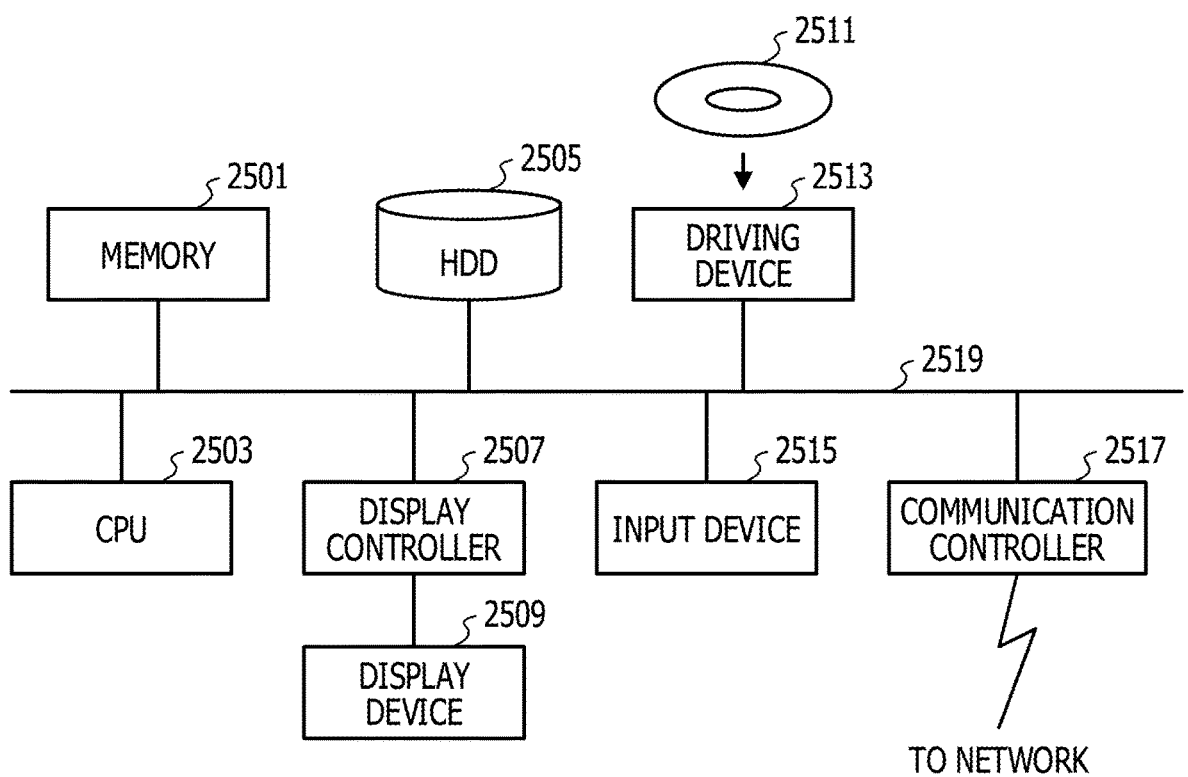
FIG. 43 is a functional block diagram of a computer.

The ring buffer 631, the pointer storage section 633, the flag storage section 635, the connection table storage section 637, the statistics table storage section 639, the control table storage section 641, the internal parameter storage section 643, and the requirement table storage section 645 are enabled using the hardware resources (for example, the hardware resources illustrated in FIG. 43).

Figure 7:
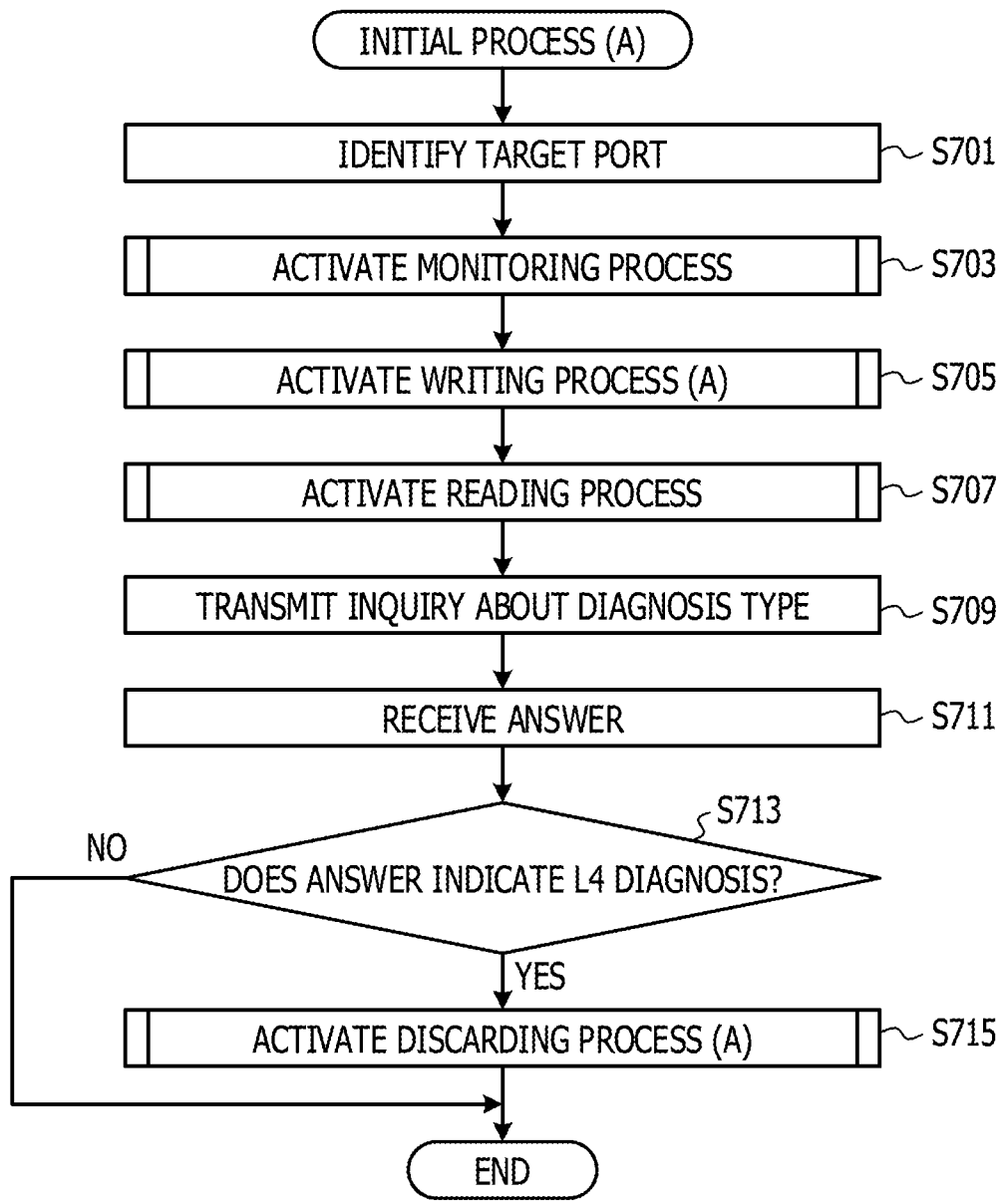
FIG. 7 is a diagram illustrating the flow of an initial process (A)

In the first embodiment, first, an initial process (A) is executed. FIG. 7 illustrates the flow of the initial process (A). The identifying section 607 identifies a target port among the virtual ports 109 included in the virtual switches 107 (in S701). An example in which the virtual port 109a is identified is described below. A method for identifying the target port is arbitrary.

The activator 609 activates the monitoring process to be executed by the monitoring section 621 (in S703). In the monitoring process, the monitoring section 621 monitors a packet having passed through the target port and copies the packet having passed through the target port. In this example, the monitoring process is executed as an independent process.

Figure 8:
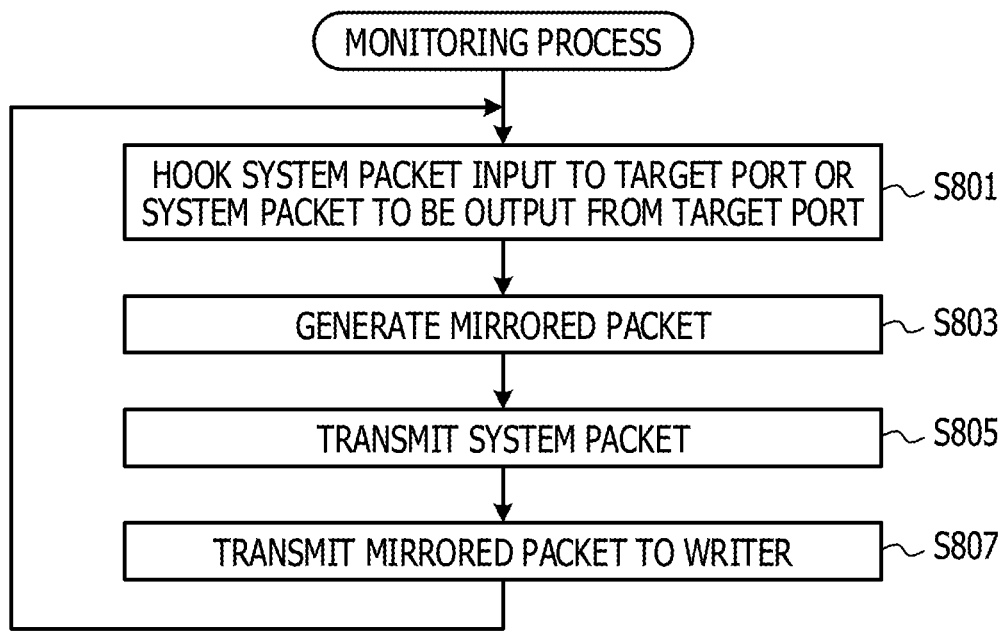
FIG. 8 is a diagram illustrating the flow of a monitoring process.

FIG. 8 illustrates the flow of the monitoring process. A packet that is transmitted between virtual machines 105 is hereinafter referred to as system packet. A packet copied by the mirroring is hereinafter referred to as mirrored packet.

The monitoring section 621 hooks a system packet input to the target port or a system packet to be output from the target port (in S801). Specifically, the system packet input to the target port and the system packet to be output from the target port are to be hooked.

The monitoring section 621 generates the same mirrored packet as the system packet (in S803). Then, the monitoring section 621 transmits the hooked system packet to a destination of the system packet (in S805).

The monitoring section 621 transmits the mirrored packet to the writer 623 (in S807), and the monitoring process returns to the process indicated by S801 so that the aforementioned processes are repeatedly executed.

Return to the description of FIG. 7. The activator 609 activates a writing process (A) to be executed by the writer 623 (in S705). In this example, the writing process (A) is executed as an independent process. The writer 623 writes the mirrored packet to the ring buffer 631 in the writing process (A).

Figure 9:
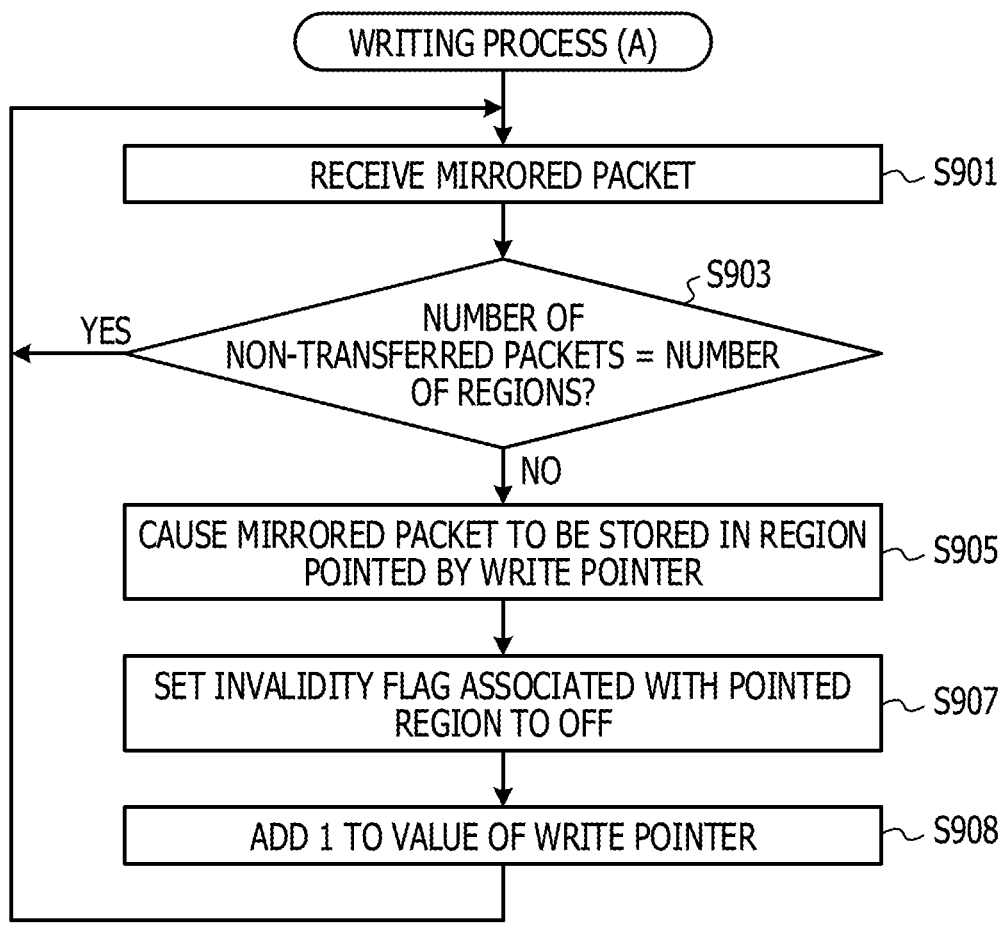
FIG. 9 is a diagram illustrating the flow of a writing process (A)

FIG. 9 illustrates the flow of the writing process (A). When the writer 623 receives the mirrored packet from the monitoring section 621 (in S901), the writer 623 determines whether or not the number of non-transferred packets matches a number N of regions of the ring buffer 631 (in S903).

Figure 10:
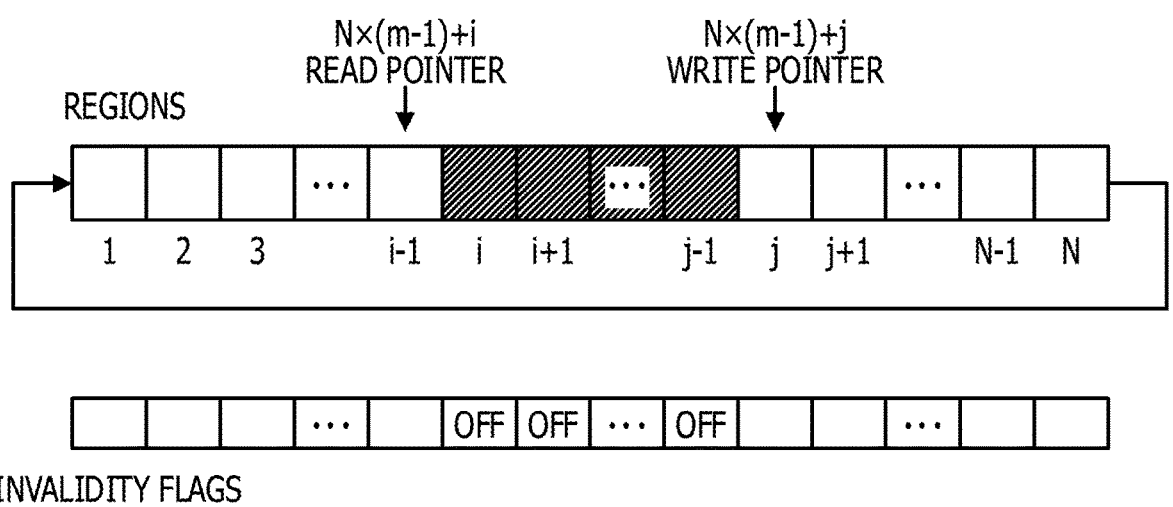
FIG. 10 is a diagram illustrating an example of a ring buffer and invalidity flags.

A configuration of the ring buffer 631 and the invalidity flags are described with reference to FIG. 10. The configuration of the ring buffer 631 and a method for operating the ring buffer 631 are arbitrary. In this example, the ring buffer 631 includes the number N of regions for storing mirrored packets. After an N-th region is used, a first region is used.

The write pointer points a region in which a mirrored packet is to be stored next. The region is identified based on a value of the remainder of the division of a value of the write pointer by the number N of regions. In this example, when the value of the write pointer in an m-th cycle of the writing process (A) is N×(m−1)+j, the write pointer points a j-th region.

In addition, the read pointer points a region from which a mirrored packet is acquired next. Like the write pointer, a value of the read pointer in an m-th cycle of the reading process is N×(m−1)+i, the read pointer points an i-th region.

Thus, mirrored packets stored in regions from the i-th region to a j−1-th region have yet to be transferred. These packets that have yet to be transferred are referred to as non-transferred packets. The number of non-transferred packets is calculated by subtracting the value of the read pointer from the value of the write pointer.

For example, when the value of the read pointer matches the value of the write pointer, a non-transferred packet does not exist. When a value obtained by subtracting the value of the read pointer from the value of the write pointer is N, the ring buffer 631 is full of packets.

In the first embodiment, invalidity flags associated with the regions are used. When an invalidity flag associated with a region storing a non-transferred packet indicates ON, the invalidity flag indicates that the non-transferred packet is already discarded. Thus, the non-transferred packet is not transferred to the diagnosing section 113. On the other hand, when the invalidity flag associated with the region indicates OFF, the invalidity flag indicates that the non-transferred packet is not discarded. Thus, the non-transferred packet is transferred to the diagnosing section 113.

Return to the description of FIG. 9. When the number of non-transferred packets matches the number N of regions of the ring buffer 631, the ring buffer 631 is full of packets and the aforementioned received mirrored packet is not stored in the ring buffer 631. Thus, the writing process (A) returns to the process indicated by S901. The mirrored packet that is not stored is discarded.

On the other hand, when the number of non-transferred packets does not match the number N of regions of the ring buffer 631, the writer 623 causes the mirrored packet to be stored in a region pointed by the write pointer (in S905).

In addition, the writer 623 sets an invalidity flag associated with the region pointed by the write pointer to OFF (in S907) and adds 1 to the value of the write pointer (in S909). Then, the writing process (A) returns to the process indicated by S901 so that the aforementioned processes are repeatedly executed.

Return to the description of FIG. 7. The activator 609 activates the reading process to be executed by the reader 625 (in S707). In this example, the reading process is executed as an independent process.

Figure 11:
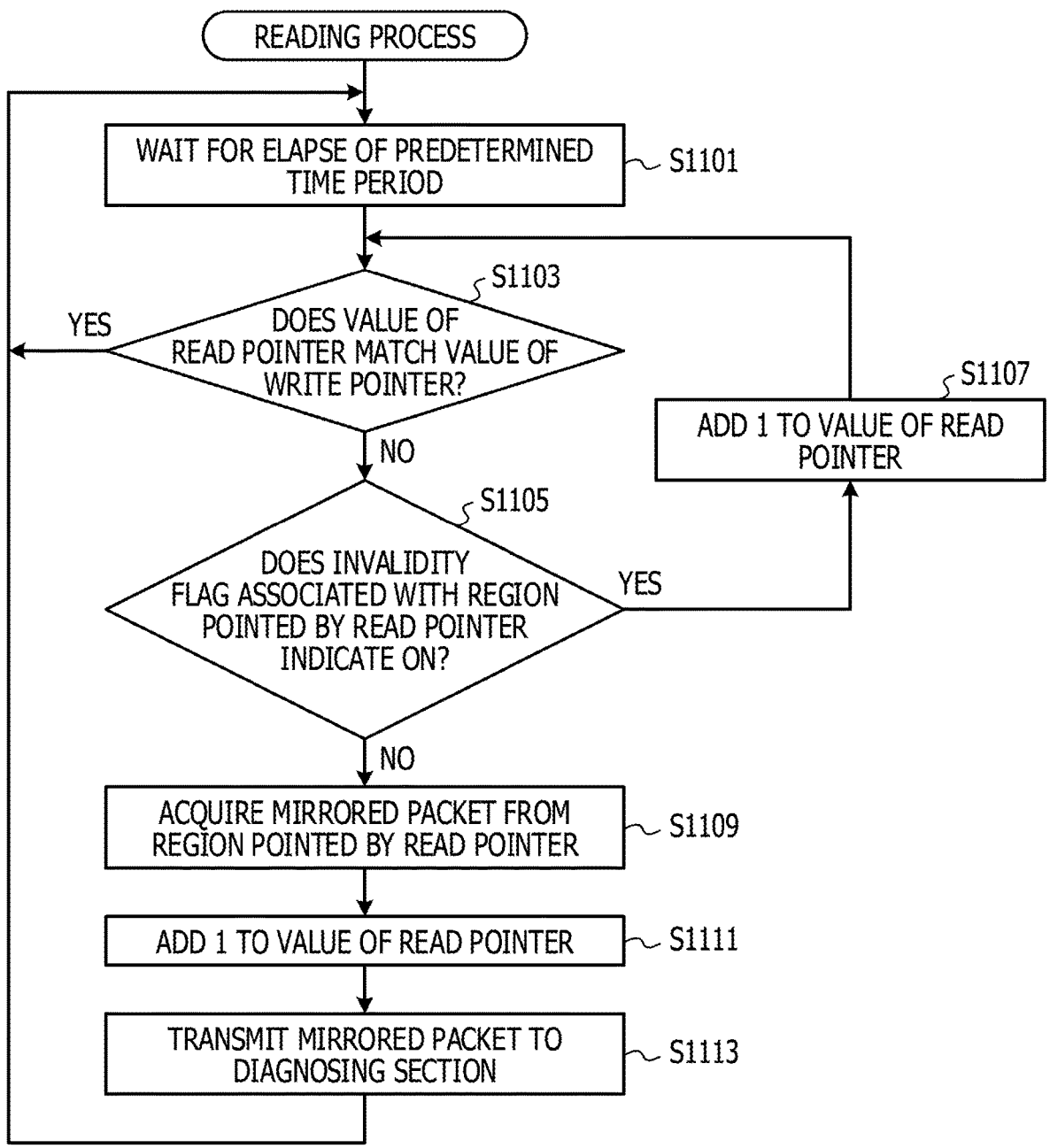
FIG. 11 is a diagram illustrating the flow of a reading process.

FIG. 11 illustrates the flow of the reading process. The reader 625 waits for the elapse of a predetermined time period (in S1101). In this example, bandwidth control that is one type of Quality of Service (QoS) control is executed. In this example, the predetermined time period is determined in advance based on an estimated bandwidth.

The reader 625 determines whether or not the value of the read pointer matches the value of the write pointer (in S1103). When the value of the read pointer matches the value of the write pointer, a non-transferred packet does not exist, and the reading process returns to the process of S1101.

When the value of the read pointer does not match the value of the write pointer, the reader 625 determines whether or not an invalidity flag associated with a region pointed by the read pointer indicates ON (in S1105).

When the invalidity flag associated with the region pointed by the read pointer indicates ON, a mirrored packet stored in the region pointed by the read pointer is to be discarded, the reader 625 adds 1 to the value of the read pointer (in S1107), and the reading process returns to the process indicated by S1103 so that the aforementioned processes are repeatedly executed.

On the other hand, when the invalidity flag associated with the region pointed by the read pointer indicates OFF, the reader 625 acquires a mirrored packet from the region pointed by the read pointer (in S1109) and adds 1 to the value of the read pointer (in S1111). The transmitter 603 transmits the mirrored packet to the diagnosing section 113 (in S1113), and the reading process returns to the process indicated by S1101 so that the aforementioned processes are repeatedly executed.

Return to the description of FIG. 7. The acquirer 611 transmits an inquiry about a diagnosis type to the diagnosing section 113 (in S709). The acquirer 611 receives an answer via the receiver 601 (in S711). The activator 609 determines whether or not the answer indicates the L4 diagnosis (in S713).

When the answer indicates the L4 diagnosis, the activator 609 activates a discarding process (A) to be executed by the discarding section 627 (in S715). In this example, the discarding process (A) is executed as an independent process. Then, the initial process (A) is terminated. When the answer does not indicate the L4 diagnosis, the initial process (A) is terminated without the activation of the discarding process (A).

Figure 12:
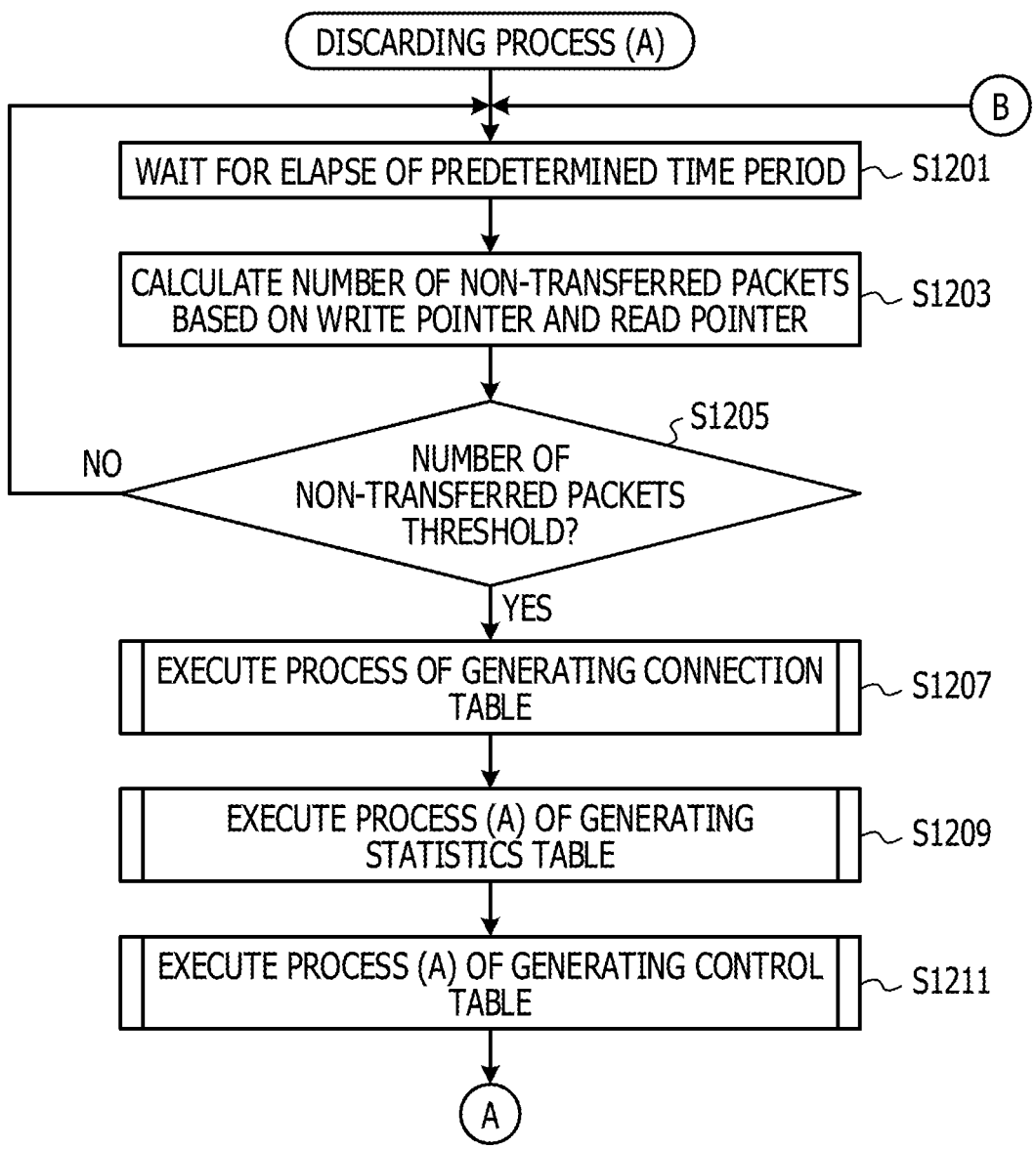
FIG. 12 is a diagram illustrating the flow of a discarding process (A)

FIG. 12 illustrates the flow of the discarding process (A). The discarding section 627 waits for the elapse of a predetermined time period (in S1201). In this example, non-transferred packets are periodically discarded.

The discarding section 627 calculates the number of non-transferred packets based on the write pointer and the read pointer (in S1203). Specifically, the discarding section 627 subtracts the value of the read pointer from the value of the write pointer, thereby calculating the number of non-transferred packets.

The discarding section 627 determines whether or not the number of non-transferred packets is equal to or larger than a threshold (in S1205). When the number of non-transferred packets is smaller than the threshold, an available region exists and the discarding process (A) returns to the process indicated by S1201 so that the aforementioned processes are repeatedly executed.

On the other hand, when the number of non-transferred packets is equal to or larger than the threshold, the discarding section 627 executes a process of generating the connection table (in S1207).

FIG. 13 illustrates an example of the connection table. In this example, the connection table includes records associated with connections. Transmission directions are taken into consideration for the connections indicated in the connection table. Specifically, a certain connection from a certain source to a certain destination and another connection from the certain destination serving as a source to the certain source serving as a destination are not treated as a single connection. The other connection is treated as a backward connection different from the certain connection.

The records of the connection table include a field in which connection ID are set, a field in which source IP addresses are set, a field in which destination IP addresses are set, a field in which a protocol is set, a field in which source port numbers are set, a field in which destination port numbers are set, a field in which the numbers of packets are set, and a field in which non-transferred packet amounts are set.

The connection IDs identify the connections. In this example, the source IP addresses identify virtual machines 105 of transmitters, and the destination IP addresses identify virtual machines 105 of receivers. The protocol is the protocol of the L4 layer. In this example, the source port numbers identify ports of the virtual machines of the transmitters, and the destination port numbers identify ports of the virtual machines 105 of the receivers. The numbers of packets are the numbers of non-transferred packets related to the connections. The non-transferred packet amounts are the sums of the sizes of the non-transferred packets related to the connections.

Figure 14:
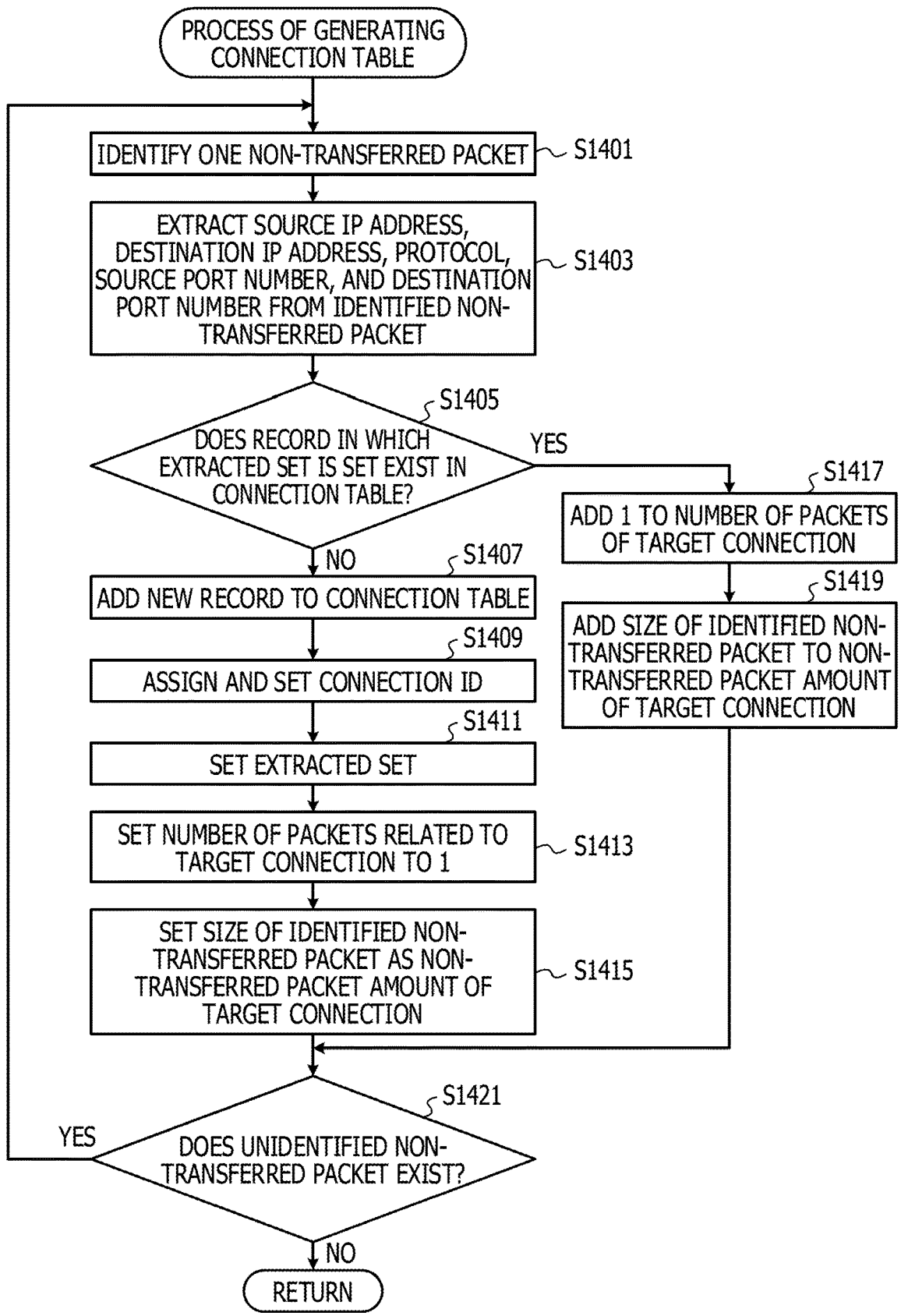
FIG. 14 is a diagram illustrating the flow of a process of generating the connection table.

FIG. 14 illustrates the flow of the process of generating the connection table. The discarding section 627 identifies one non-transferred packet (in S1401). For example, the discarding section 627 sequentially identifies one region among regions from a region pointed by the read pointer to a region immediately preceding a region pointed by the write pointer and identifies a non-transferred packet stored in the identified region.

The discarding section 627 extracts, from a header of the identified non-transferred packet, a set of a source IP address, a destination IP address, the protocol, a source port number, and a destination port number (in S1403).

The discarding section 627 determines whether or not a record in which the extracted set is set exists in the connection table (in S1405).

When the discarding section 627 determines that the record in which the extracted set is set does not exist in the connection table, the discarding section 627 adds a new record to the connection table (in S1407). Then, the discarding section 627 assigns a connection ID and sets the connection ID in the added record (in S1409).

The discarding section 627 sets the extracted set in the added record or sets the source IP address extracted in S1403, the destination IP address extracted in S1403, the protocol extracted in S1403, the source port number extracted in S1403, and the destination port number extracted in S1403 in the added record (in S1411). In addition, the discarding section 627 sets the number of packets related to a target connection having the assigned connection ID to 1 (in S1413). Furthermore, the discarding section 627 sets the size of the identified non-transferred packet as a non-transferred packet amount of the target connection (in S1415).

When the discarding section 627 determines that the record in which the extracted set is set exists in the connection table, the target connection identified by the extracted set is already registered in the connection table. The discarding section 627 adds 1 to the number of packets of the target connection or the number of packets that has been set in the record (in S1417). In addition, the discarding section 627 adds the size of the identified non-transferred packet to a non-transferred packet amount of the target connection or the non-transferred packet amount set in the record (in S1419).

After the process of S1415 or S1419 is terminated, the discarding section 627 determines whether or not an unidentified non-transferred packet exists (in S1421). When the discarding section 627 determines that the unidentified non-transferred packet exists, the process of generating the connection table returns to the process identified by S1401 so that the aforementioned processes are repeatedly executed.

On the other hand, when the discarding section 627 determines that the unidentified non-transferred packet does not exist, the process of generating the connection table is terminated and returns to the discarding process (A) that is a source of calling the process of generating the connection table.

Return to the description of FIG. 12. The discarding section 627 executes a process (A) of generating the statistics table (in S1209).

FIG. 15 illustrates an example of the statistics table. In this example, the statistics table includes records associated with connections. The records of the statistics table include a field in which connection IDs are set, a field in which ratios of the numbers of packets are set, a field in which ratios of non-transferred packet amounts are set, a field in which average packet sizes are set, and a field in which target reduction amounts are set.

The connection IDs identify the connections. The ratios of the numbers of packets are ratios of the numbers of non-transferred packets related to the connections to the number of all non-transferred packets. The ratios of the non-transferred packet amounts are ratios of the non-transferred packet amounts of the connections to the sum (the total amount of all the non-transferred packets) of the sizes of all the non-transferred packets. The average packet sizes are average values of the sizes of the non-transferred packets related to the connections. The target reduction amounts are data amounts by which the amounts of the non-transferred packets related to the connections are reduced by the discarding of non-transferred packets.

Figure 16:
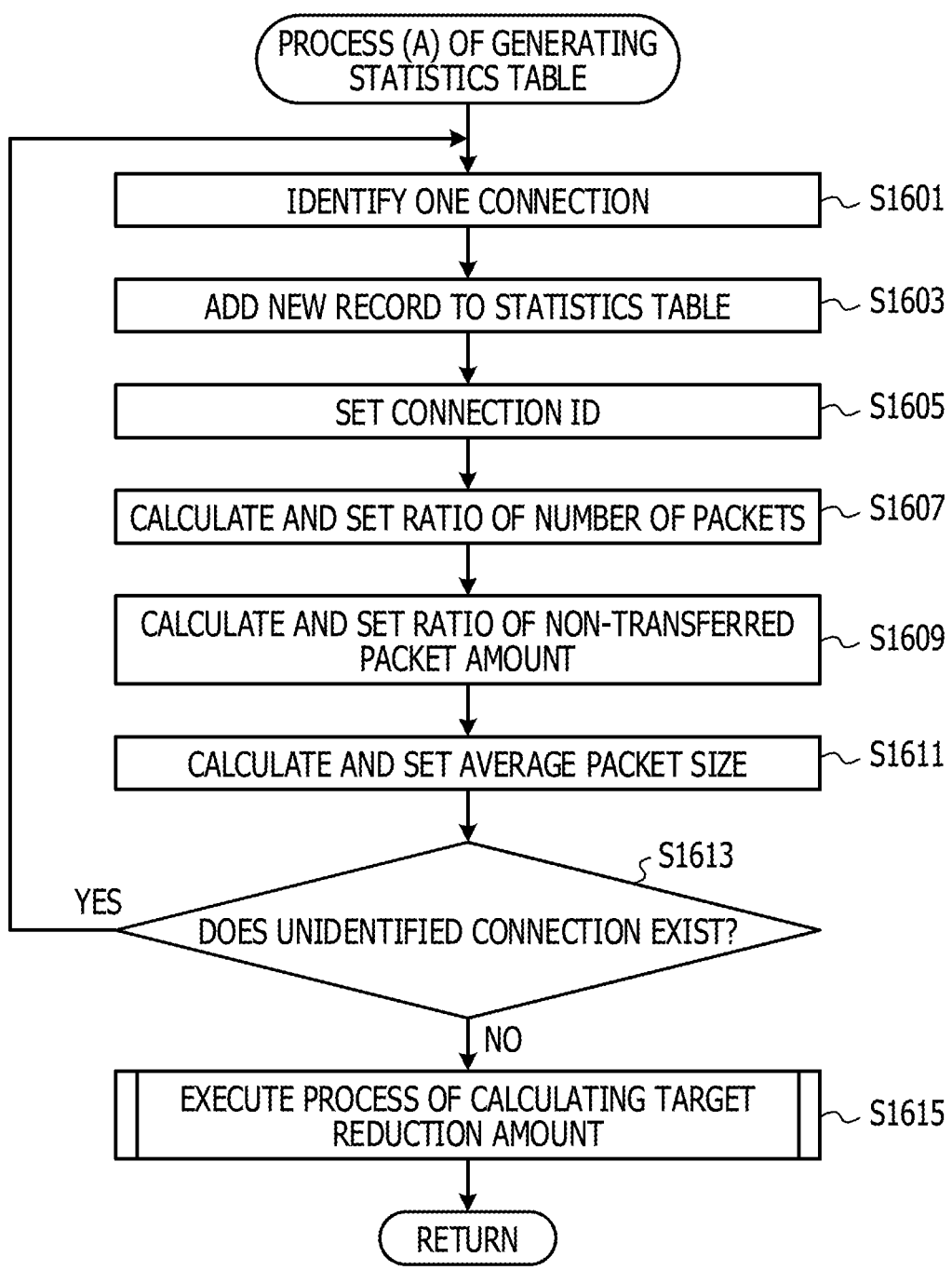
FIG. 16 is a diagram illustrating the flow of a process (A) of generating the statistics table.

FIG. 16 illustrates the flow of the process (A) of generating the statistics table. The discarding section 627 identifies one connection (in S1601). Specifically, the discarding section 627 identifies one record of the connection table in order and identifies the connection ID set in the identified record.

The discarding section 627 adds a new record to the statistics table (in S1603). The discarding section 627 sets a connection ID of the connection identified in S1601 in the added record (in S1605).

The discarding section 627 calculates the ratio of the number of packets and sets the calculated ratio of the number of packets in the added record (in S1607). Specifically, the discarding section 627 calculates the ratio of the number of packets by dividing the number of packets related to the identified connection by the total number of packets related to all the connections.

The discarding section 627 calculates a ratio of a non-transferred packet amount and sets the calculated ratio of the non-transferred packet amount in the added record (in S1609). Specifically, the discarding section 627 calculates the ratio of the non-transferred packet amount by dividing the non-transferred packet amount of the identified connection by the sum of non-transferred packet amounts of all the connections.

The discarding section 627 calculates an average packet size and sets the calculated average packet size in the added record (in S1611). Specifically, the discarding section 627 calculates the average packet size by dividing the non-transferred packet amount of the identified connection by the number of packets related to the identified connection.

The discarding section 627 determines whether or not an unidentified connection exists (in S1613). When the discarding section 627 determines that the unidentified connection exists, the process (A) of generating the statistics table returns to the process indicated by S1601 so that the aforementioned processes are repeatedly executed.

On the other hand, when the discarding section 627 determines whether or not the unidentified connection does not exist, the discarding section 627 executes a process of calculating a target reduction amount (in S1615). In the process of calculating the target reduction amount, the discarding section 627 calculates a data amount by which the non-transferred packet amount of the target connection is reduced by the discarding of one or more non-transferred packets.

Figure 17:
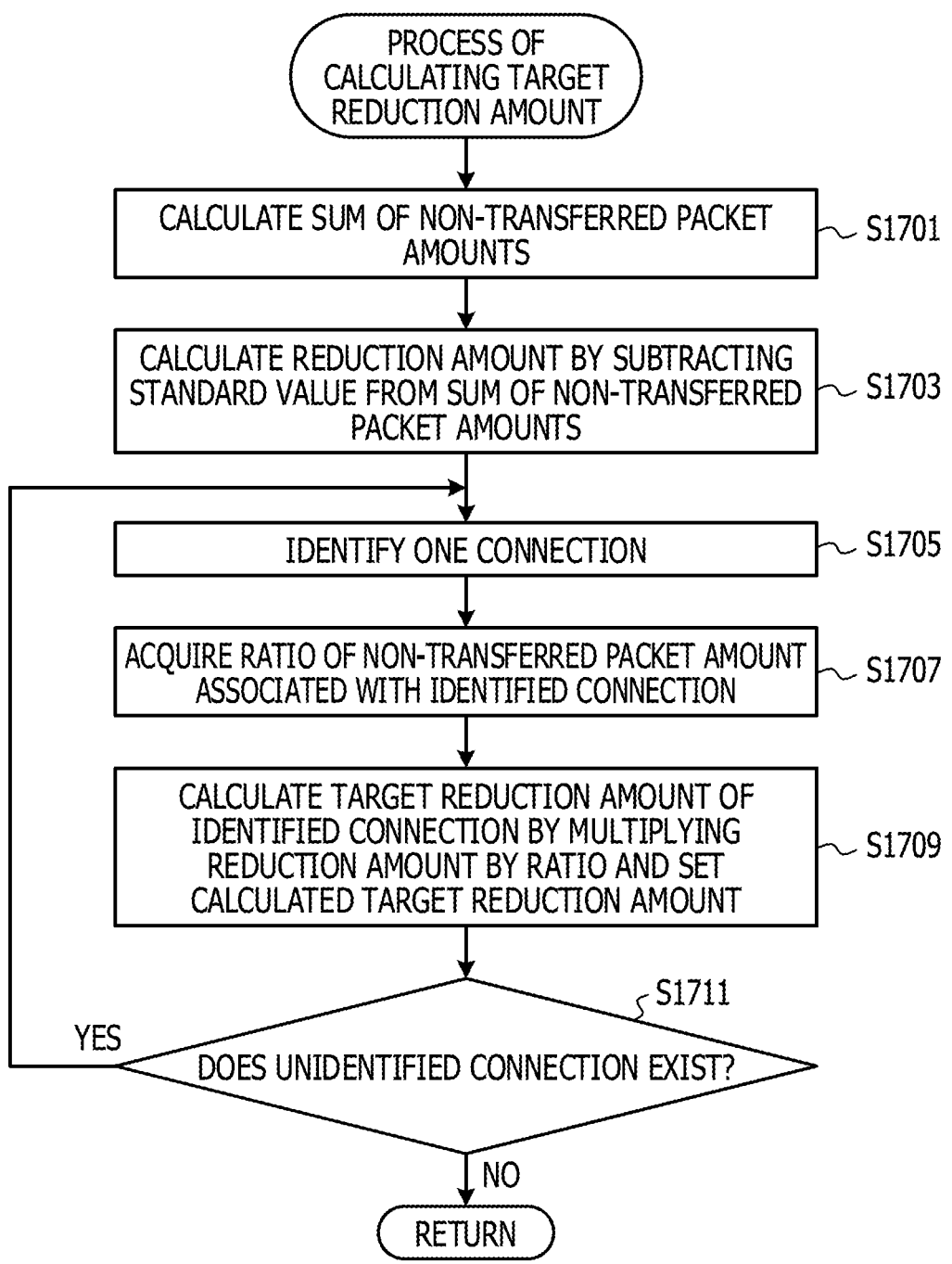
FIG. 17 is a diagram illustrating the flow of a process of calculating a target reduction amount.

FIG. 17 illustrates the flow of the process of calculating the target reduction amount. The discarding section 627 calculates the sum of non-transferred packet amounts set in all records of the connection table (in S1701).

The discarding section 627 calculates a reduction amount by subtracting a standard value from the sum of the non-transferred packet amounts (in S1703). The discarding section 627 may calculate the standard value by multiplying the entire size of the ring buffer 631 by a predetermined percentage.

The discarding section 627 identifies one connection (in S1705). Specifically, the discarding section 627 identifies one record of the statistics table in order.

The discarding section 627 acquires the ratio, associated with the identified connection, of the non-transferred packet amount or acquires the ratio, set in the identified record, of the non-transferred packet amount (in S1707). The discarding section 627 multiplies the reduction amount by the ratio of the non-transferred packet amount to calculate the target reduction amount of the identified connection and sets the calculated target reduction amount in the identified record (in S1709).

The discarding section 627 determines whether or not an unidentified connection exists (in S1711). When the discarding section 627 determines that the unidentified connection exists, the process of calculating the target reduction amount returns to the process indicated by S1705 so that the aforementioned processes are repeatedly executed.

On the other hand, when the discarding section 627 determines that the unidentified connection does not exist, the process of calculating the target reduction amount is terminated and returns to the process (A) of generating the statistics table or a source of calling the process of calculating the target reduction amount.

Return to the description of FIG. 16. When the process of calculating the target reduction amount is terminated, the process (A) of generating the statistics table is terminated and returns to the discarding process (A) that is a source of calling the process (A) of generating the statistics table.

Return to the description of FIG. 12. Next, the discarding section 627 executes a process (A) of generating the control table (in S1211).

FIG. 18 illustrates an example of the control table. In this example, the control table includes records associated with connections. The records of the control table include a field in which connection IDs are set, a field in which backward connections are set, a field in which discarded amounts are set, a field for counters, a field in which decimation intervals are set, multiple fields for discarded packets, and multiple fields for control packets. Since multiple packets related to a single connection may be discarded, the multiple fields for discarded packets are included in the control table. In addition, since data on multiple control packets related to a single connection is held, the multiple fields for control packets are included in the control table.

The connection IDs identify the connections. In the field for backward connections, IDs of connections whose directions are opposite to the connections having the connection IDs set in the field for connection IDs are set. The discarded amounts are the sums of the sizes of discarded non-transferred packets among non-transferred packets related to the connections having the connection IDs. The counters are used to count the numbers of non-transferred packets related to the connections having the connection IDs. The decimation intervals are inverse numbers of ratios (discarding ratios) of the numbers of packets to be discarded to the number of non-transferred packets.

Each of the fields for discarded packets includes a field in which sequence numbers of the discarded packets are set and a field in which data sizes of the discarded packets are set. The sequence numbers of the discarded packets are sequence numbers of discarded packets among the non-transferred packets related to the connections having the connection IDs. The data sizes of the discarded packets are sizes of body data included in the discarded packets. A sequence number and data size of the same discarded packet are treated as a combination.

The fields for control packets include a field in which control types of the control packets are set and a field in which sequence numbers of the control packets are set. The control types of the control packets are the control types (for example, SYN and SYN-ACK) of the control packets among the non-transferred packets related to the connections having the connection IDs. The sequence numbers of the control packets are the sequence numbers of the control packets among the non-transferred packets related to the connections having the connection IDs. A control type and sequence number of the same control packet is treated as a combination.

Figure 19:
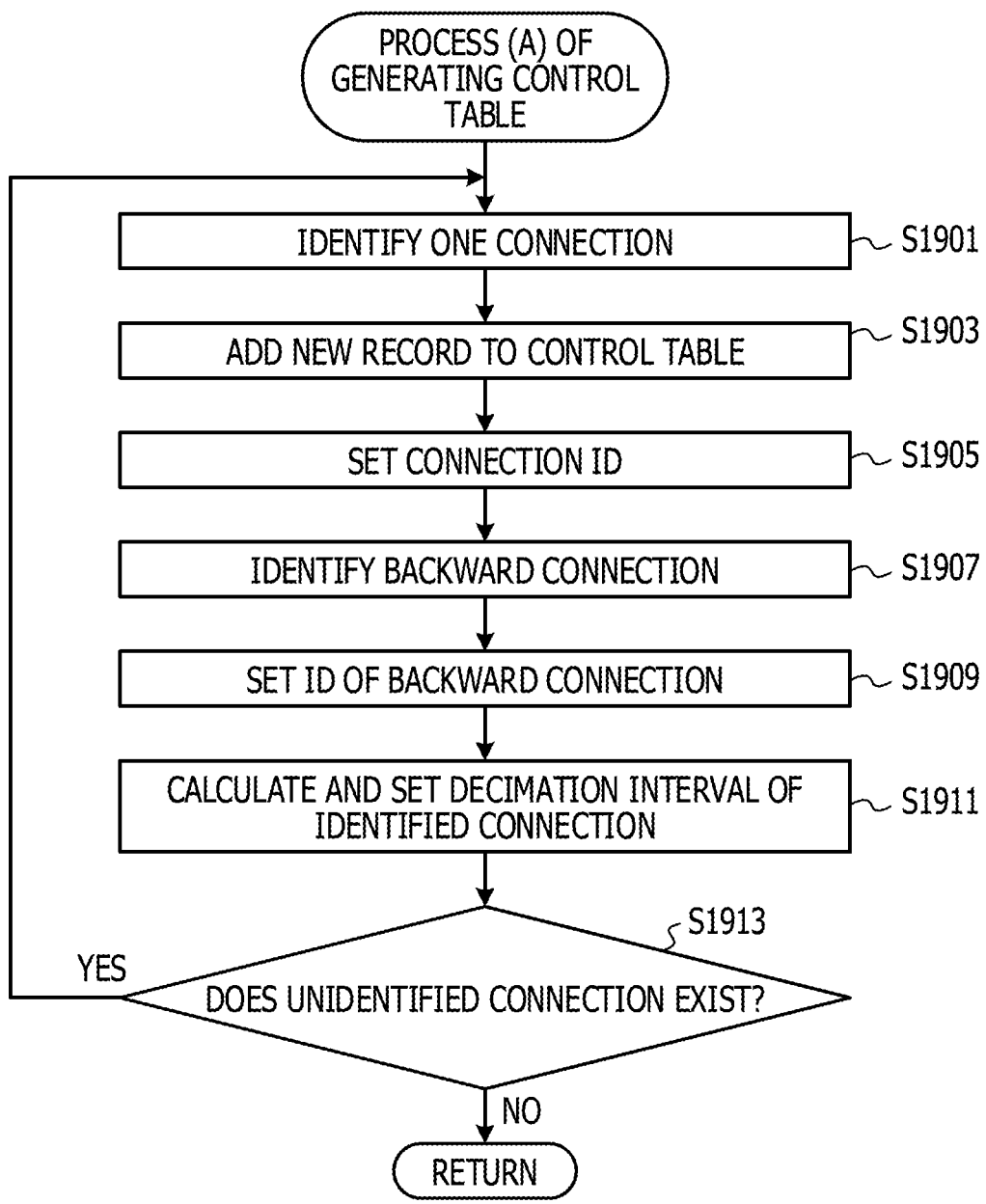
FIG. 19 is a diagram illustrating the flow of a process (A) of generating the control table.

FIG. 19 illustrates the flow of the process (A) of generating the control table. The discarding section 627 identifies one connection (in S1901). Specifically, the discarding section 627 identifies one record of the connection table in order and identifies the connection ID set in the identified record.

The discarding section 627 adds a new target record to the control table (in S1903) and sets the identified connection ID in the added record (in S1905).

The discarding section 627 identifies a backward connection based on the connection table (in S1907). Specifically, a source IP address associated with the connection identified in S1901 is set as a destination IP address, a destination IP address associated with the identified connection is set as a source IP address, a source port number associated with the identified connection is set as a destination port number, a destination port number associated with the identified connection is set as a source port number, and a connection associated with a protocol matching a protocol associated with the identified connection is identified.

The discarding section 627 sets an ID of the identified backward connection in the added record in the field for backward connections (in S1909).

The discarding section 627 calculates a decimation interval of the identified connection and sets the calculated decimation interval in the added record (in S1911). Specifically, the discarding section 627 calculates, based on the statistics table, the number of discarded packets by dividing a target reduction amount associated with the identified connection by an average packet size associated with the identified connection. Then, the discarding section 627 calculates, based on the connection table, the decimation interval by dividing the number of divided packets related to the identified connection by the number of discarded packets.

The discarding section 627 determines whether or not an unidentified connection exists (in S1913). When the discarding section 627 determines that the unidentified connection exists, the process (A) of generating the control table returns to the process indicated by S1901 so that the aforementioned processes are repeatedly executed.

On the other hand, when the discarding section 627 determines that the unidentified connection does not exist, the process (A) of generating the control table is terminated and returns to the discarding process (A) that is a source of calling the process (A) of generating the control table.

Return to the description of FIG. 12. The discarding process (A) proceeds to a process of S2001 via terminal A.

Figure 20:
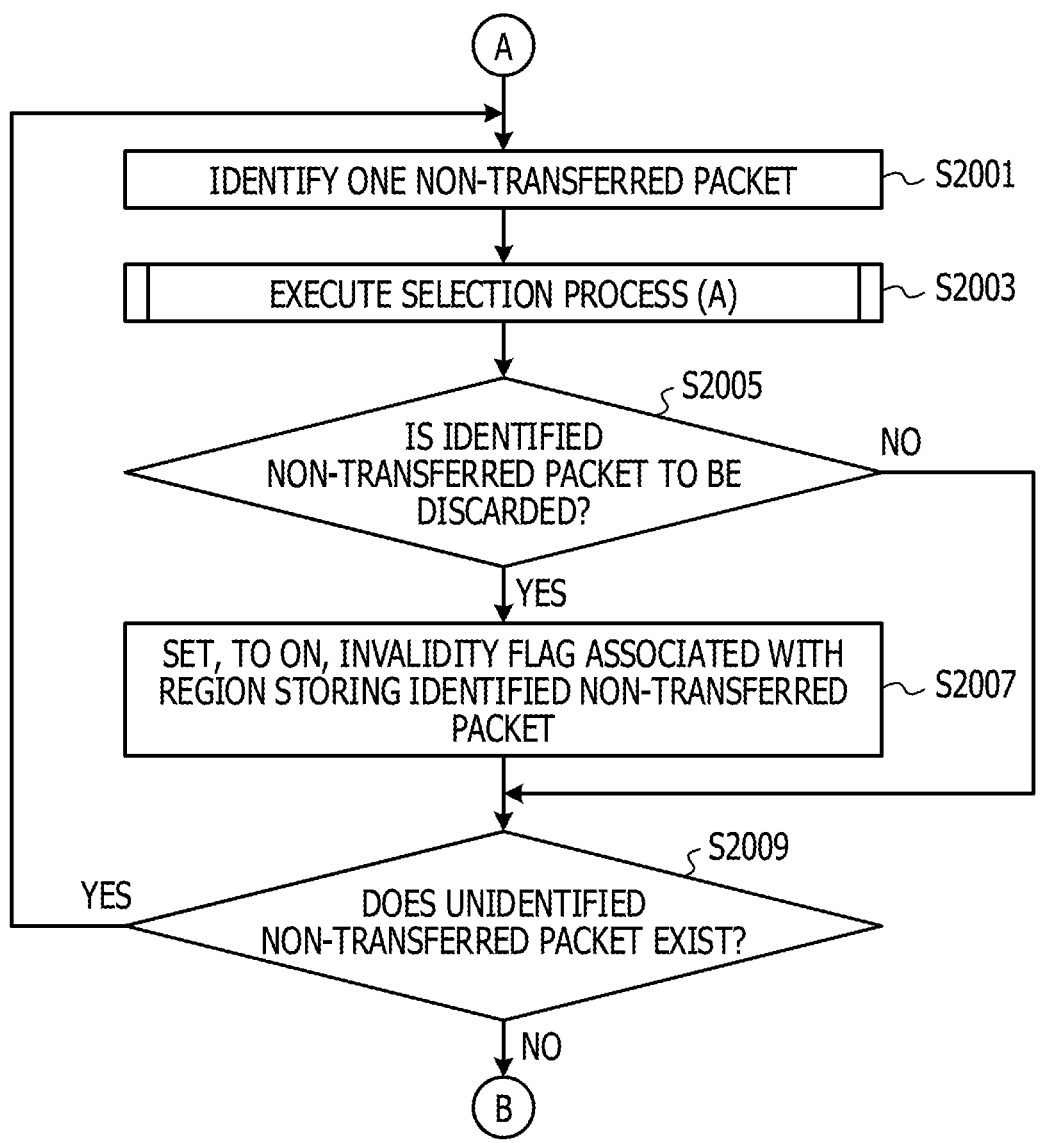
FIG. 20 is a diagram illustrating the flow of a discarding process (A)

FIG. 20 is described below. The discarding section 627 identifies one non-transferred packet in the same manner as S1401 illustrated in FIG. 14 (in S2001).

The discarding section 627 executes a selection process (in S2003). In the selection process, the discarding section 627 selects a non-transferred packet to be discarded. In the first embodiment, a selection process (A) is executed.

Figure 21:
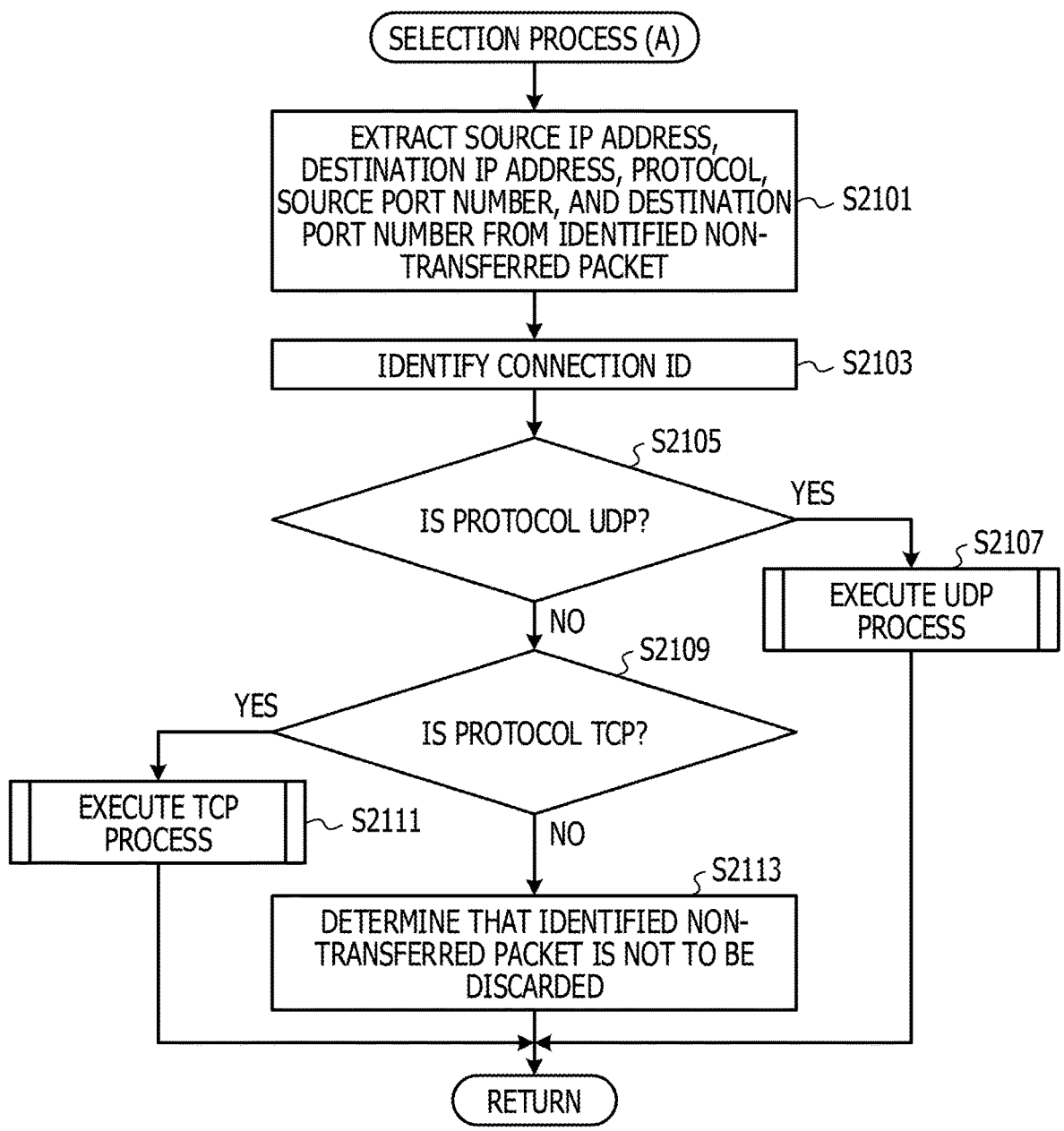
FIG. 21 is a diagram illustrating the flow of a selection process (A)

FIG. 21 illustrates the flow of the selection process (A). The discarding section 627 extracts, from a header of the identified non-transferred packet, a set of a source IP address, a destination IP address, a protocol, a source port number, and a destination port number (in S2101).

The discarding section 627 identifies a connection ID associated with the extracted set based on the connection table (in S2103).

The discarding section 627 determines whether or not the protocol extracted in S2101 is the UDP (in S2105). When the discarding section 627 determines that the protocol is the UDP, the discarding section 627 executes a UDP process (in S2107). In the UDP process, the discarding section 627 makes determination related to a UDP packet. The UDP process is described later with reference to FIG. 22. After the UDP process is terminated, the selection process (A) is terminated and returns to the discarding process (A) that is the source of calling the selection process (A).

On the other hand, when the discarding section 627 determines that the protocol is not the UDP, the discarding section 627 determines whether or not the process is the TCP (in S2109). When the discarding section 627 determines that the protocol is the TCP, the discarding section 627 executes a TCP process (in S2111). In the TCP process, the discarding section 627 makes determination related to a TCP packet. The TCP process is described later with reference to FIGS. 23 to 31. After the TCP process is terminated, the selection process (A) is terminated and returns to the discarding process (A) that is the source of calling the selection process (A).

On the other hand, when the process is not the TCP process, the discarding section 627 determines that the identified non-transferred packet is not to be discarded (in S2113). Then, the selection process (A) is terminated and returns to the discarding process (A) that is the source of calling the selection process (A).

Figure 22:
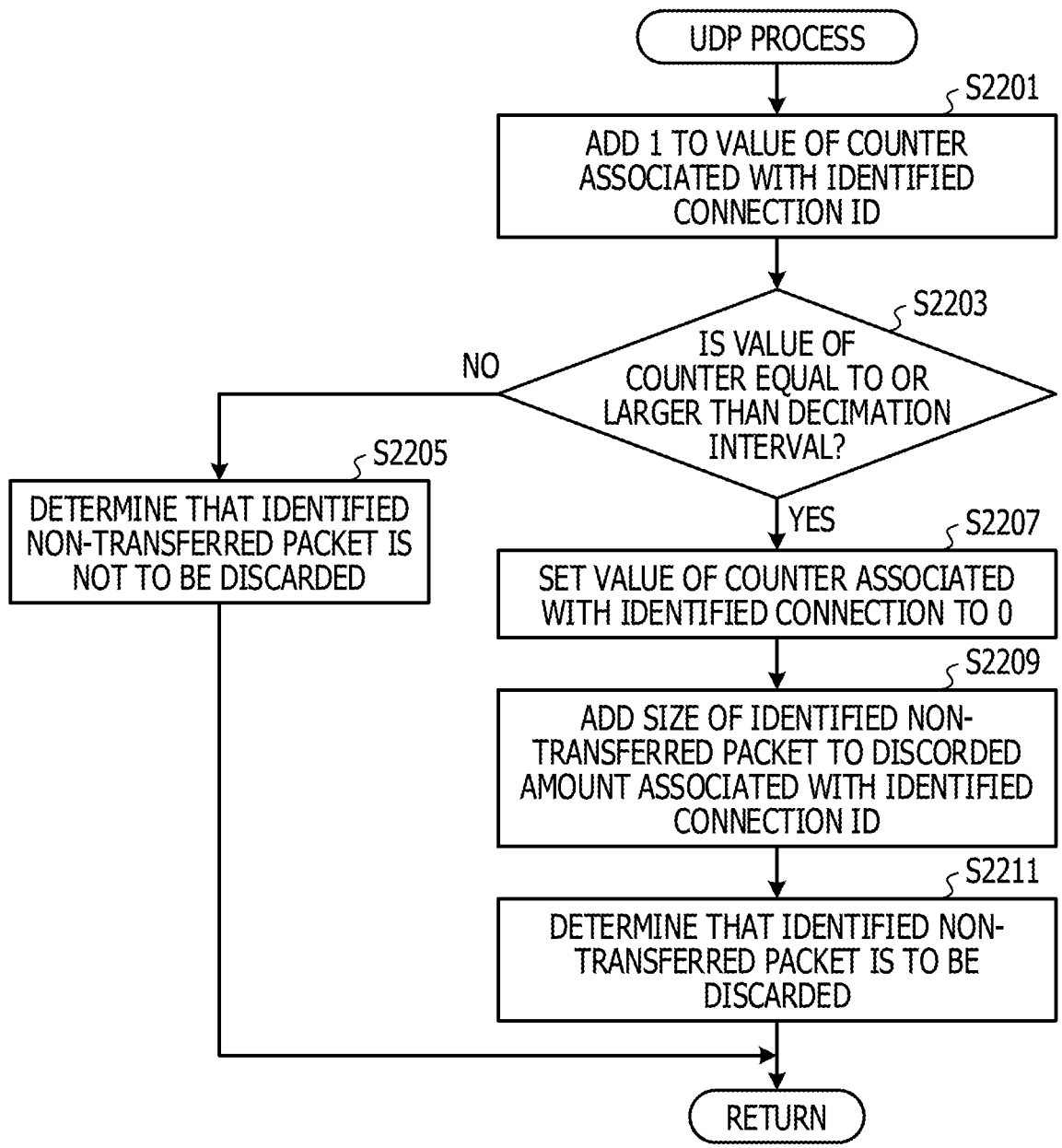
FIG. 22 is a diagram illustrating the flow of a User Datagram Protocol (UDP) process.

FIG. 22 illustrates the flow of the UDP process. The discarding section 627 adds 1 to a value of a counter associated with the connection ID identified in S2103 illustrated in FIG. 21 in the control table (in S2201).

The discarding section 627 determines whether or not the value of the counter is equal to or larger than a decimation interval (in S2203). When the discarding section 627 determines that the value of the counter is smaller than the decimation interval, the discarding section 627 determines that the identified non-transferred packet is not to be discarded (in S2205). Then, the UDP process is terminated and returns to the selection process (A) that is a source of calling the UDP process.

On the other hand, when the discarding section 627 determines that the value of the counter is equal to or larger than the decimation interval, the discarding section 627 sets the counter associated with the identified connection ID to 0 (in S2207). The discarding section 627 adds the size of the identified non-transferred packet to a discarded amount associated with the identified connection ID (in S2209). Then, the discarding section 627 determines that the identified non-transferred packet is to be discarded (in S2211).

Then, the UDP process is terminated and returns to the selection source (A) that is a source of calling the UDP process.

Figure 23:
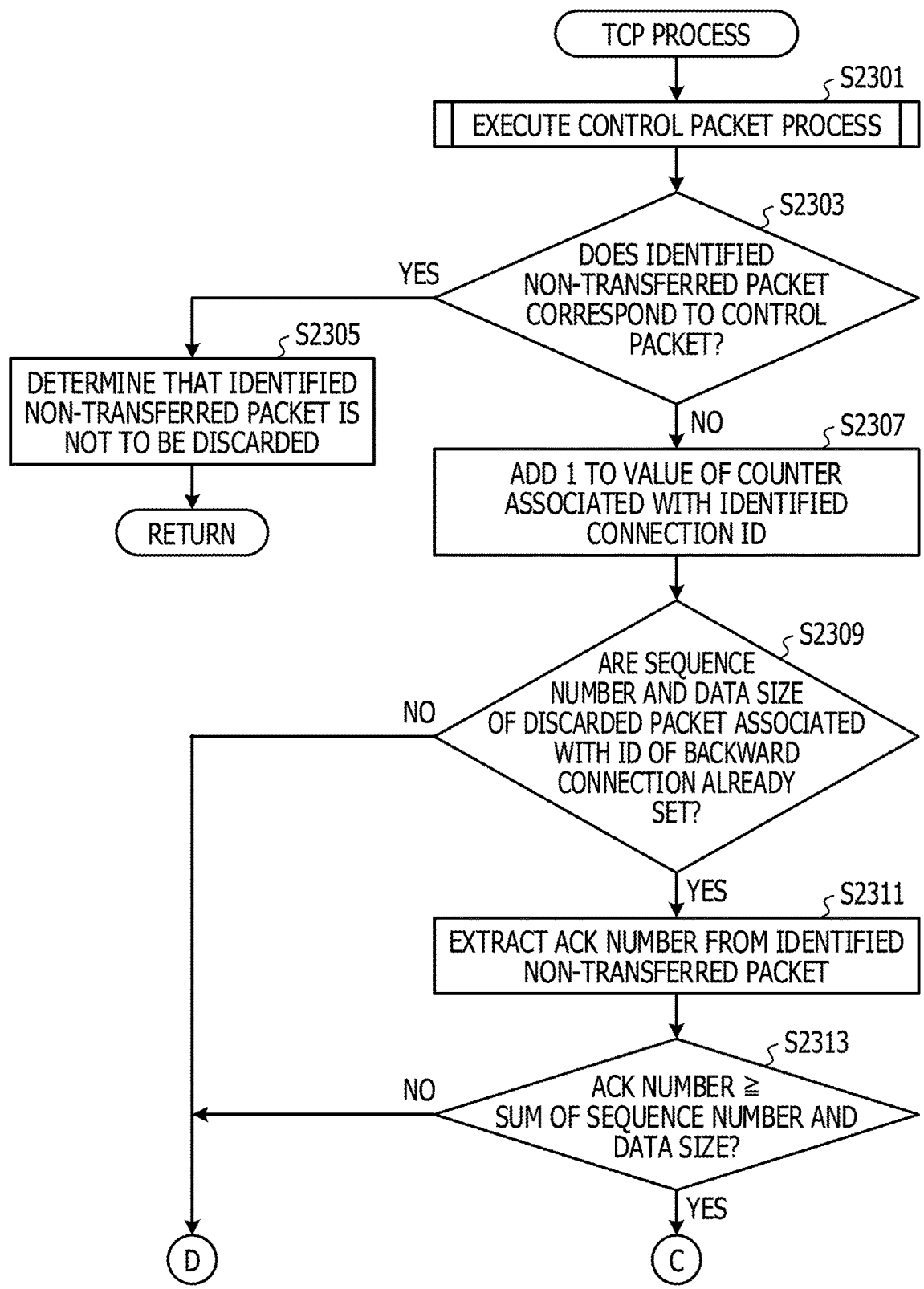
FIG. 23 is a diagram illustrating the flow of a TCP process.

FIG. 23 illustrates the flow of the TCP process. The discarding section 627 executes a control packet process (in S2301). In the control packet process, the discarding section 627 determines whether or not the non-transferred packet identified in S2001 illustrated in FIG. 20 corresponds to a predetermined control packet.

Figure 24:
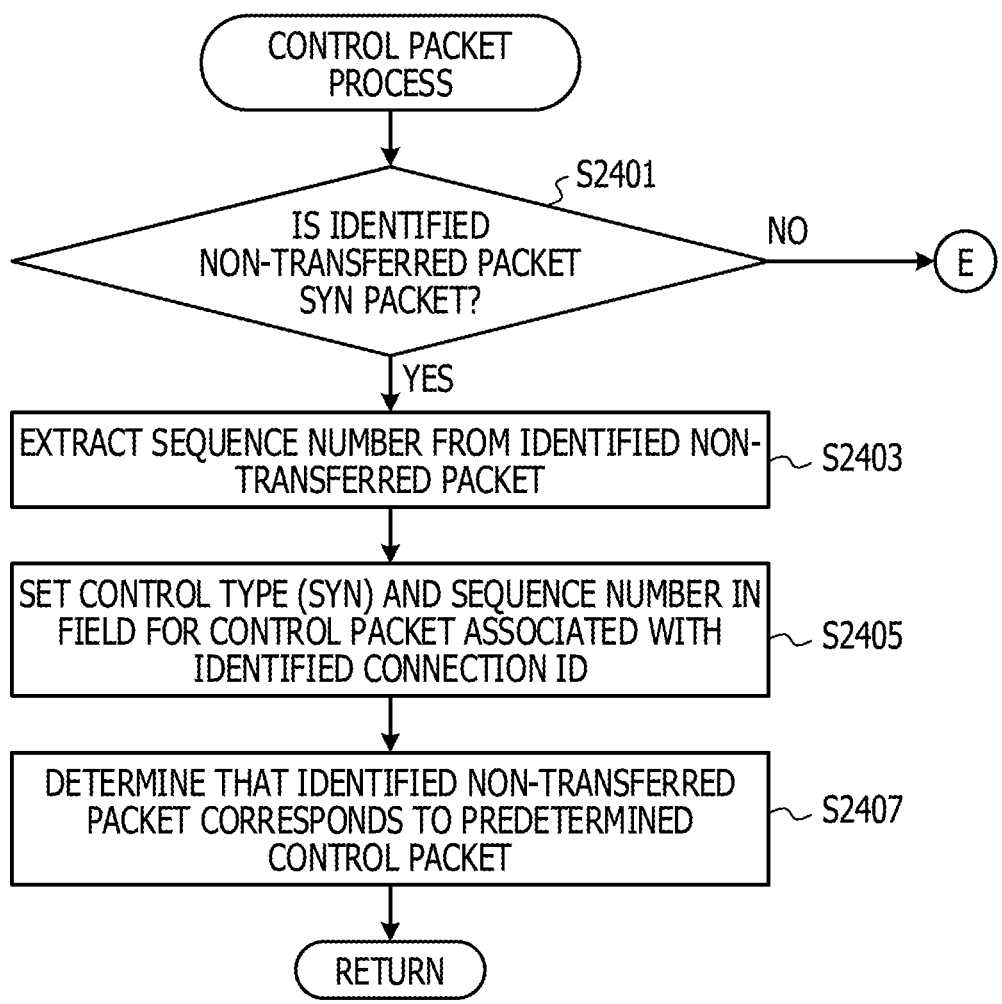
FIG. 24 is a diagram illustrating the flow of a control packet process.

FIG. 24 illustrates the flow of the control packet process. The discarding section 627 determines whether or not the non-transferred packet identified in S2001 illustrated in FIG. 20 is a SYN packet (201 illustrated in FIG. 2) (in S2401).

When the discarding section 627 determines that the identified non-transferred packet is the SYN packet, the discarding section 627 extracts a sequence number from the header of the identified non-transferred packet (in S2403). The discarding section 627 sets a combination of a control type (SYN) and the sequence number in a field for a control packet associated with the connection ID identified in S2103 illustrated in FIG. 21 in the control table (in S2405). As described above, for multiple control packets, a combination of a control type and a sequence number may be set.

Then, the discarding section 627 determines that the identified non-transferred packet corresponds to the predetermined control packet (in S2407). Then, the control packet process is terminated and returns to the TCP process that is a source of calling the control packet process.

Figure 25:
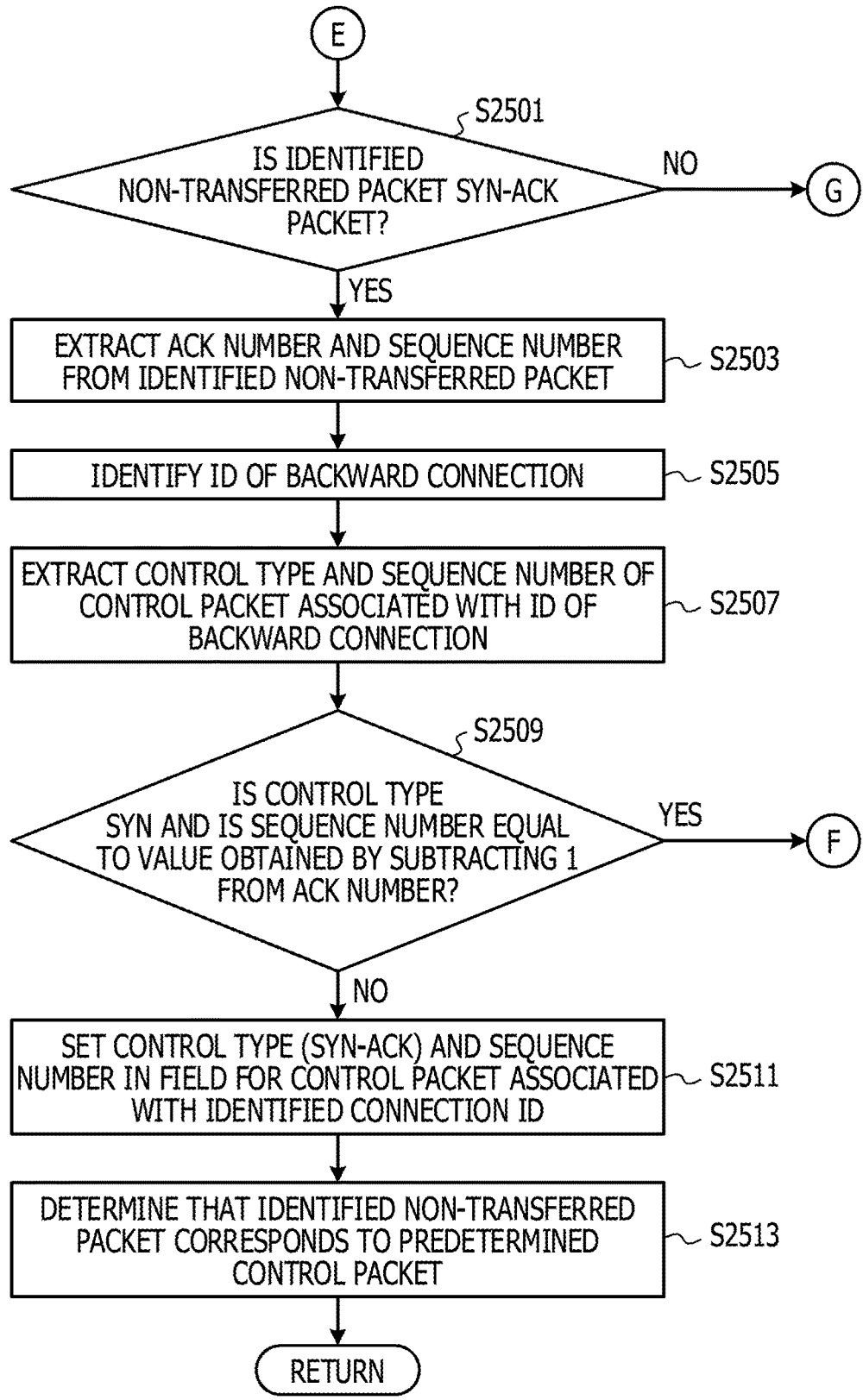
FIG. 25 is a diagram illustrating the flow of the control packet process.

When the discarding section 627 determines that the identified non-transferred packet is not the SYN packet in the process of S2401, the control packet process proceeds to a process of S2501 illustrated in FIG. 25 via terminal E.

FIG. 25 is described below. The discarding section 627 determines whether or not the non-transferred packet identified in S2001 illustrated in FIG. 20 is a SYN-ACK packet (203 illustrated in FIG. 2) (in S2501).

When the discarding section 627 determines that the identified non-transferred packet is the SYN-ACK packet, the discarding section 627 extracts an ACK number and a sequence number from the header of the identified non-transferred packet (in S2503).

The discarding section 627 identifies an ID of a backward connection based on the control table (in S2505). Then, the discarding section 627 extracts a control type and a sequence number from a field for a control packet associated with the ID of the backward connection in the control table (in S2507). Specifically, the discarding section 627 identifies a record in which the identified ID of the backward connection is set in the field for connection IDs, and the discarding section 627 acquires the control type and sequence number set in the identified record in the field for the control packet.

The discarding section 627 determines whether or not the control type extracted in S2507 is SYN and whether or not the sequence number extracted in S2507 is equal to a value obtained by subtracting 1 from the ACK number extracted from the identified non-transferred packet (in S2509).

When the control type extracted in S2507 is not SYN or when the sequence number extracted in S2507 is not equal to the value obtained by subtracting 1 from the ACK number extracted from the identified non-transferred packet, the discarding section 627 sets a control type (SYN-ACK) and the sequence number in the field for the control packet associated with the identified connection ID (in S2511).

Then, the discarding section 627 determines that the non-transferred packet identified in S2001 illustrated in FIG. 20 corresponds to the predetermined control packet (in S2513). Then, the control packet process is terminated and returns to the TCP process that is a source of calling the control packet process.

Figure 26:
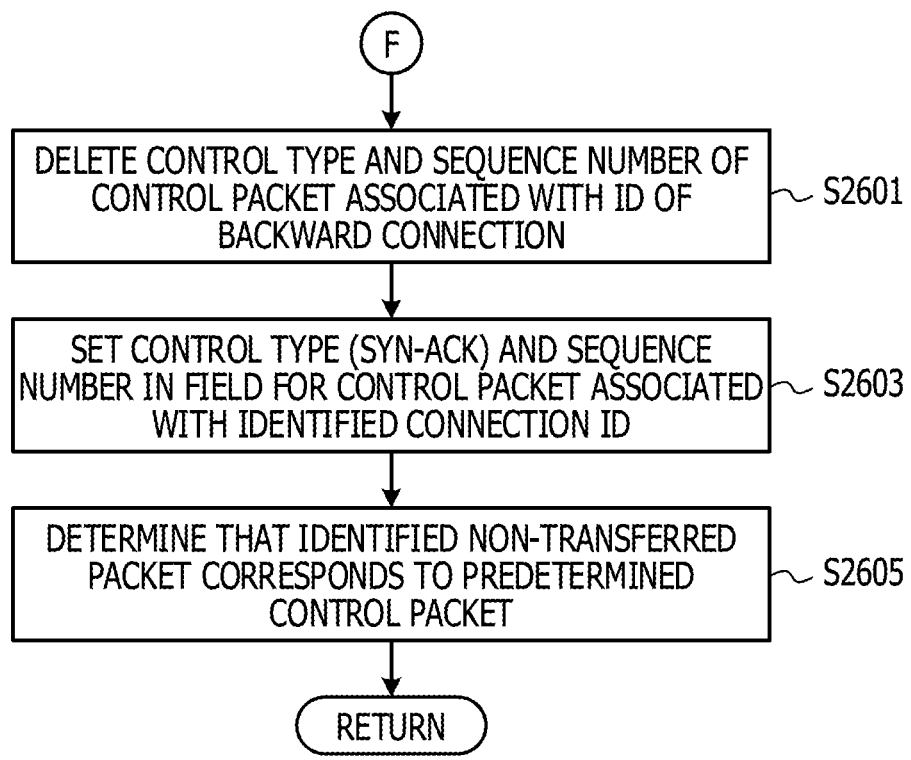
FIG. 26 is a diagram illustrating the flow of the control packet process.

When the discarding section 627 determines that the control type is SYN and that the sequence number is equal to the value obtained by subtracting 1 from the ACK number, the control packet process proceeds to a process of S2601 illustrated in FIG. 26 via terminal F.

FIG. 26 is described below. The discarding section 627 deletes the control type and sequence number set in the field for the control packet associated with the ID of the backward connection identified in S2505 illustrated in FIG. 25 in the control table (in S2601).

The discarding section 627 sets the control type (SYN-ACK) and the sequence number in the field for the control packet associated with the identified connection ID (in S2603).

Then, the discarding section 627 determines that the non-transferred packet identified in S2001 illustrated in FIG. 20 corresponds to the predetermined control packet (in S2605). Then, the control packet process is terminated and returns to the TCP process that is the source of calling the control packet process.

Return to the description of FIG. 25. When the discarding section 627 determines that the identified non-transferred packet is not the SYN-ACK packet in S2501, the control packet process proceeds to a process of S2701 illustrated in FIG. 27 via terminal G.

Figure 27:
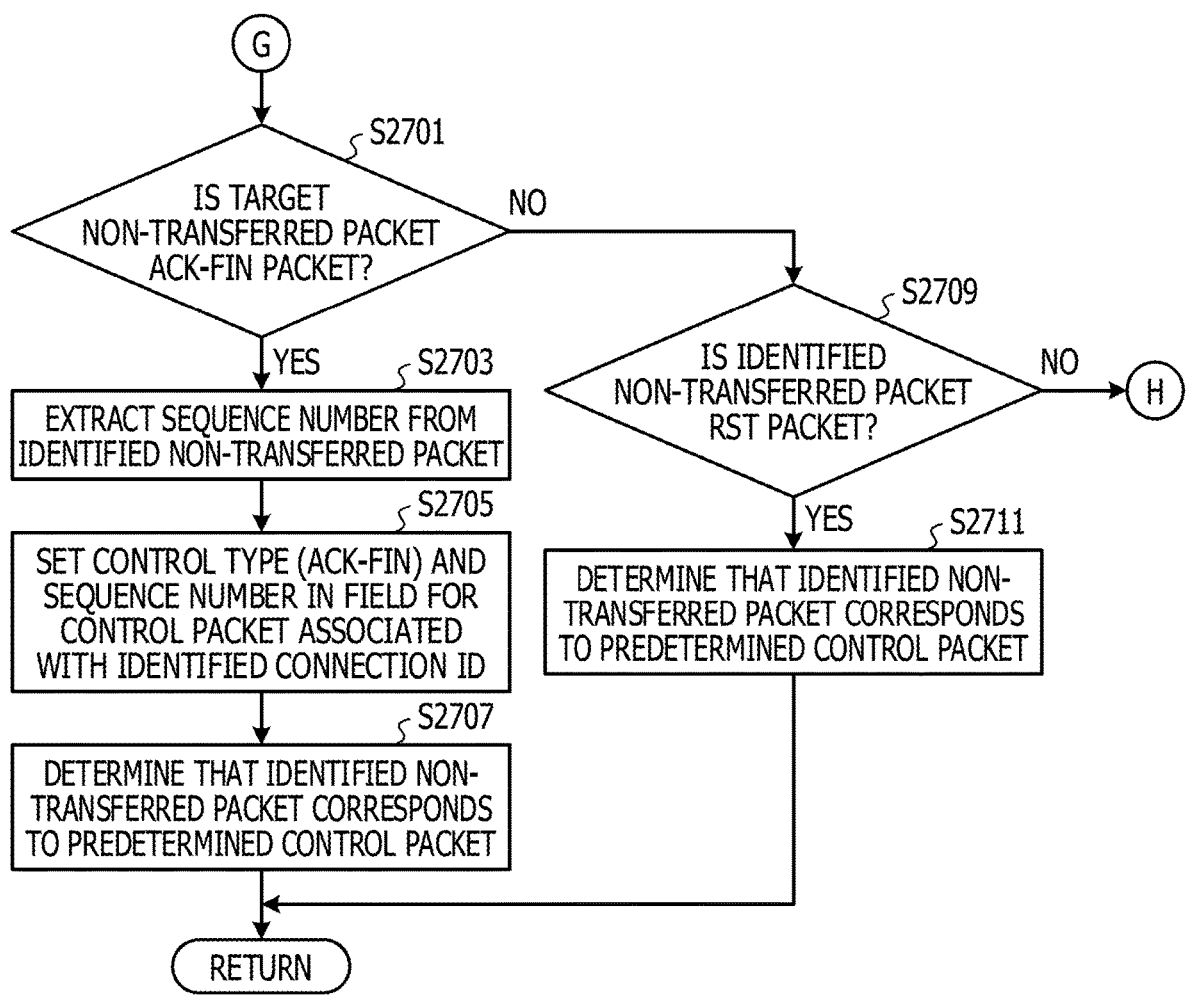
FIG. 27 is a diagram illustrating the flow of the control packet process.

FIG. 27 is described below. The discarding section 627 determines whether or not the non-transferred packet identified in S2001 illustrated in FIG. 20 is an ACK-FIN packet (401 and 405 illustrated in FIG. 4) (in S2701).

When the discarding section 627 determines that the identified non-transferred packet is the ACK-FIN packet, the discarding section 627 extracts the sequence number from the header of the identified non-transferred packet (in S2703). The discarding section 627 sets a control type (ACK-FIN) and the sequence number in the field for the control packet associated with the identified connection ID (in S2705).

Then, the discarding section 627 determines that the identified non-transferred packet corresponds to the predetermined control packet (in S2707). Then, the control packet process is terminated and returns to the TCP process that is the source of calling the control packet process.

When the discarding section 627 determines that the identified non-transferred packet is not the ACK-FIN packet in S2701, the discarding section 627 determines whether or not the identified non-transferred packet is an RST packet (in S2709). In this example, the RST packet in which RST that is one of control flags indicates ON is excluded from packets to be discarded.

When the discarding section 627 determines that the identified non-transferred packet is the RST packet, the discarding section 627 determines that the identified non-transferred packet corresponds to the predetermined control packet (in S2711). Then, the control packet process is terminated and returns to the TCP process that is the source of calling the control packet process.

Figure 28:
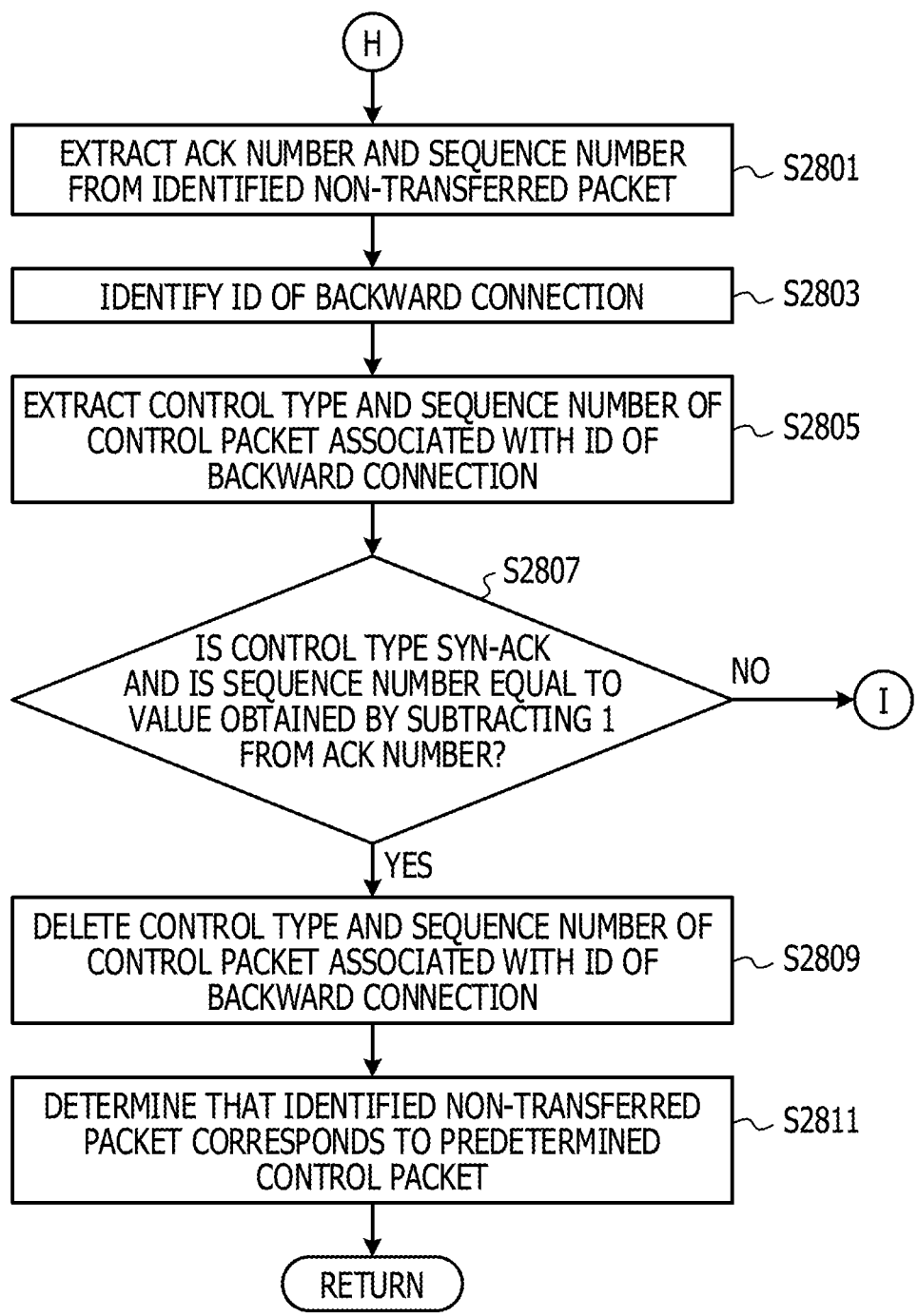
FIG. 28 is a diagram illustrating the flow of the control packet process.

On the other hand, when the discarding section 627 determines that the identified non-transferred packet is not the RST packet, the control packet process proceeds to a process of S2801 illustrated in FIG. 28 via terminal H.

FIG. 28 is described below. The discarding section 627 extracts the ACK number and the sequence number from the non-transferred packet identified in S2001 illustrated in FIG. 20 (in S2801). For example, when the control packet process is executed on the ACK packet 205 illustrated in FIG. 2, the control packet process passes through a route including the process of S2801. When the control packet process is executed on the ACK packets 403 and 407 illustrated in FIG. 4, the control packet process passes through the route including the process of S2801. When the control packet process is executed on the packets 301 to 311 illustrated in FIG. 3, the control packet process passes through the route including the process of S2801. In addition, when the control packet process is executed on the packets 501 to 505 illustrated in FIG. 5 and the ACK packets 507 and 509 illustrated in FIG. 5, the control packet process passes through the route including the process of S2801.

The discarding section 627 identifies the ID of the backward connection based on the control table (in S2803). The discarding section 627 extracts the control type and the sequence number from the field for the control packet associated with the ID of the backward connection based on the control table (in S2805).

The discarding section 627 determines whether or not the control type extracted in S2805 is SYN-ACK and whether or not the sequence number extracted in S2805 is equal to a value obtained by subtracting 1 from the ACK number extracted from the identified non-transferred packet (in S2807).

When the control type is SYN-ACK and the sequence number is equal to the value obtained by subtracting 1 from the ACK number, the discarding section 627 deletes the control type and sequence number set in the field for the control packet associated with the ID of the backward connection (in S2809). When the control packet process is executed on the ACK packet 205 illustrated in FIG. 2, the control packet process passes through a route including the process of S2809.

The discarding section 627 determines that the identified non-transferred packet corresponds to the predetermined control packet (in S2811). Then, the control packet process is terminated and returns to the TCP process that is the source of calling the control packet process.

Figure 29:
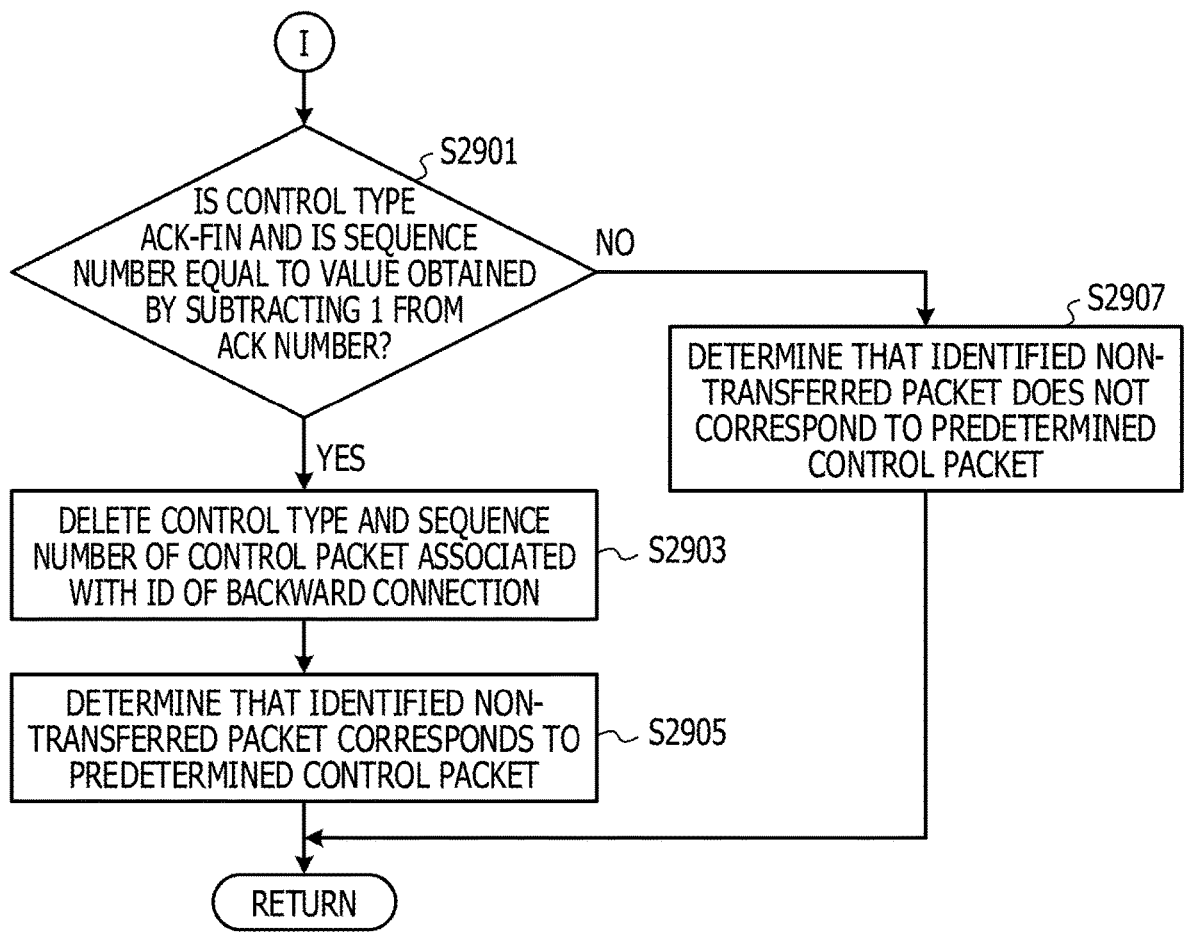
FIG. 29 is a diagram illustrating the flow of the control packet process.

On the other hand, when the control type is not SYN-ACK or when the sequence number is not equal to the value obtained by subtracting 1 from the ACK number, the control packet process proceeds to a process of S2901 illustrated in FIG. 29 via terminal I.

FIG. 29 is described below. The discarding section 627 determines whether or not the control type extracted in S2805 illustrated in FIG. 28 is ACK-FIN and whether or not the sequence number extracted in S2805 illustrated in FIG. 28 is equal to a value obtained by subtracting 1 from the ACK number extracted in S2801 illustrated in FIG. 28 (in S2901).

When the control type is ACK-FIN and the sequence number is equal to the value obtained by subtracting 1 from the ACK number, the discarding section 627 deletes the control type and sequence number set in the field for the control packet associated with the ID of the backward connection in the control table (in S2903). When the control packet process is executed on the ACK packets 403 and 407 illustrated in FIG. 4, the control packet process passes through a route including the process of S2903.

Then, the discarding section 627 determines that the identified non-transferred packet corresponds to the predetermined control packet (in S2905). Then, the control packet process is terminated and returns to the TCP process that is the source of calling the control packet process.

On the other hand, when the control type is not ACK-FIN or when the sequence number is not equal to the value obtained by subtracting 1 from the ACK number, the discarding section 627 determines that the identified non-transferred packet does not correspond to the predetermined control packet (in S2907). Then, the control packet process is terminated and returns to the TCP process that is the source of calling the control packet process. When the control packet process is executed on the packets 301 to 311 illustrated in FIG. 3, the control packet process passes through a route including the process of S2907. In addition, when the control packet process is executed on the packets 501 to 505 illustrated in FIG. 5 and the ACK packets 507 and 509 illustrated in FIG. 5, the control packet process passes through the route including the process of S2907.

Return to the description of FIG. 23. The discarding section 627 branches the TCP process based on whether the non-transferred packet identified in S2001 illustrated in FIG. 20 corresponds to the predetermined control packet (in S2303).

When the identified non-transferred packet corresponds to the predetermined control packet, the discarding section 627 determines that the identified non-transferred packet is not to be discarded (in S2305). Then, the TCP process is terminated and returns to the selection process (A) that is the source of calling the TCP process.

On the other hand, when the identified non-transferred packet does not correspond to the predetermined control packet, the discarding section 627 adds 1 to the value of the counter associated with the identified connection ID (in S2307). Then, the discarding section 627 determines whether or not a sequence number and a data size are already set in a field for a discarded packet associated with the ID of the backward connection (in S2309).

When the discarding section 627 determines that the sequence number and the data size are not set in the field for the discarded packet, the identified non-transferred packet is not excluded from packets to be discarded. This is due to the fact that this case does not correspond to "the case where the previously transmitted packet is to be discarded". In this case, the TCP process proceeds to a process of S3101 illustrated in FIG. 31 via terminal D.

On the other hand, when the discarding section 627 determines that the sequence number and the data size are already set in the field for the discarded packet, the discarding section 627 extracts the ACK number from the header of the identified non-transferred packet (in S2311). Then, the discarding section 627 determines whether or not the ACK number is equal to or larger than the sum of the sequence number and the data size (in S2313).

As described with reference to FIG. 5, when the ACK number is equal to or larger than the sum of the sequence number and the data size, the identified non-transferred packet is excluded from packets to be discarded. In this case, the TCP process proceeds to a process of S3001 illustrated in FIG. 30 via terminal C.

On the other hand, when the ACK number is smaller than the sum of the sequence number and the data size, the identified non-transferred packet is not excluded from packets to be discarded. In this case, the TCP process proceeds to a process of S3101 illustrated in FIG. 31 via terminal D.

Figure 30:
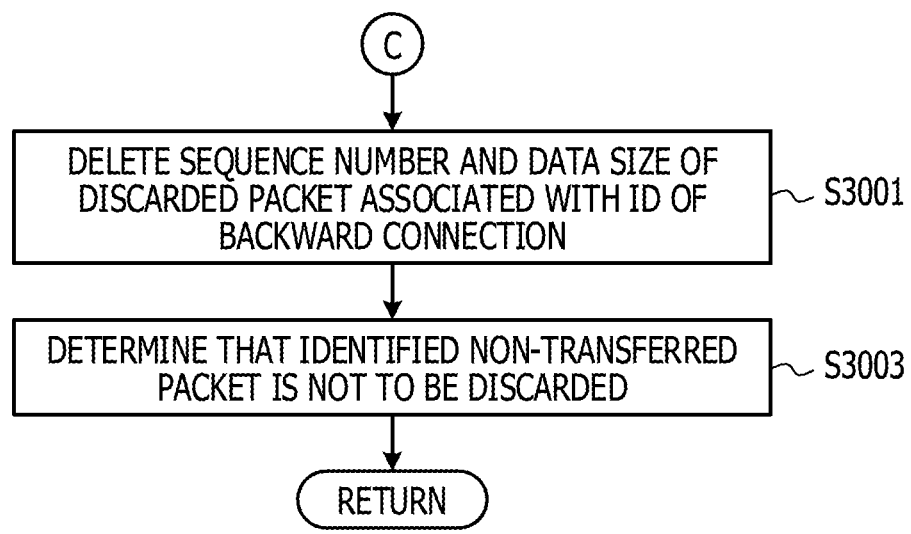
FIG. 30 is a diagram illustrating the flow of the TCP process.

FIG. 30 is described below. The discarding section 627 deletes the sequence number and data size set in the field for the discarded packet associated with the ID of the backward connection identified in S2505 illustrated in FIG. 25 in the control table (in S3001).

Then, the discarding section 627 determines that the non-transferred packet identified in S2001 illustrated in FIG. 20 is not to be discarded (in S3003). Then, the TCP process is terminated and returns to the selection process (A) that is the source of calling the TCP process.

Figure 31:
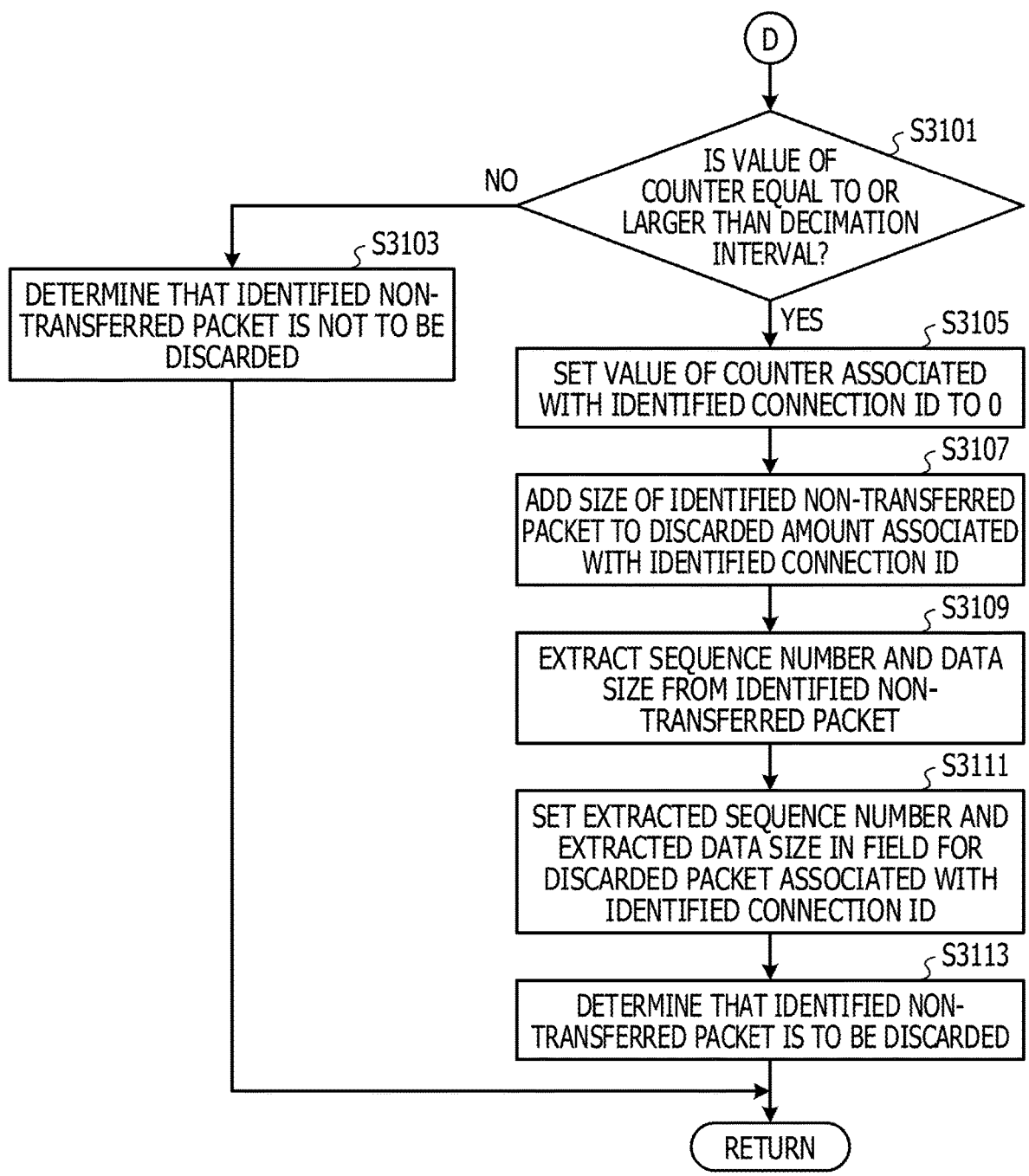
FIG. 31 is a diagram illustrating the flow of the TCP process.

FIG. 31 is described below. The discarding section 627 determines whether or not the value of the counter to which 1 has been added in S2307 illustrated in FIG. 23 is equal to or larger than a decimation interval (in S3101). The decimation interval is acquired from a record that is included in the control table and in which the connection ID identified in S2103 illustrated in FIG. 21 is set.

When the discarding section 627 determines that the value of the counter is smaller than the decimation interval, the discarding section 627 determines that the non-transferred packet identified in S2001 illustrated in FIG. 20 is not to be discarded (in S3103). Then, the TCP process is terminated and returns to the selection process (A) that is the source of calling the TCP process.

On the other hand, when the discarding section 627 determines that the value of the counter is equal to or larger than the decimation interval, the discarding section 627 sets the value of the counter associated with the connection ID identified in S2103 illustrated in FIG. 21 to 0 (in S3105). In addition, the discarding section 627 adds the size of the identified non-transferred packet to the discarded amount associated with the identified connection ID (in S3107).

The discarding section 627 extracts the sequence number and the data size from the header of the identified non-transferred packet (in S3109). The discarding section 627 sets the extracted sequence number and the extracted data size in the field for the discarded packet associated with the identified connection ID in the control table (in S3111). In addition, the discarding section 627 determines that the identified non-transferred packet is to be discarded (in S3113). After that, the TCP process is terminated and returns to the selection process (A) that is the source of calling the TCP process.

Return to the description of FIG. 20. The discarding section 627 branches the discarding process (A) based on whether or not the non-transferred packet identified in S2001 is to be discarded (in S2005).

When the discarding section 627 determines that the identified non-transferred packet is to be discarded, the discarding section 627 sets an invalidity flag associated with a region storing the identified non-transferred packet to ON (in S2007). Then, the discarding process (A) proceeds to a process of S2009.

When the discarding section 627 determines that the identified non-transferred packet is not to be discarded, the discarding process (A) proceeds to the process of S2009 without the execution of the process of S2007.

Then, the discarding section 627 determines whether or not an unidentified non-transferred packet exists (in S2009). When the discarding section 627 determines that the unidentified non-transferred packet exists, the discarding process (A) returns to the process indicated by S2001 so that the aforementioned processes are repeatedly executed.

On the other hand, when the discarding section 627 determines that the unidentified non-transferred packet does not exist, the discarding process (A) returns to the process of S1201 illustrated in FIG. 12 via terminal B.

According to the first embodiment, it is useful to identify a connection period in a predetermined protocol.

When a certain packet including body data and previously transmitted is to be discarded, a response packet to the certain packet is not to be discarded and it is useful to identify the amount of data to be transmitted.

Second Embodiment

Although the first embodiment describes the example in which the port mirroring section 111 acquires a diagnosis type from the diagnosing section 113 and operates, the second embodiment describes an example in which the port mirroring section 111 acquires the requirement table from the diagnosing section 113 and operates.

FIG. 32 illustrates an example of the requirement table. The requirement table includes a field in which a non-transfer requirement is set, a field in which a non-discarding requirement is set, and a field in which a discarding requirement is set.

The non-transfer requirement is a requirement in which a target packet is excluded from packets to be transferred to the diagnosing section 113. In this example, in the non-transfer requirement, a protocol set in the target packet is the Internet Control Message Protocol (ICMP).

The non-discarding requirement is a requirement in which a target packet is excluded from packets to be discarded. In this example, in the non-discarding requirement, an IP address of a communication destination is IP-3. Specifically, when a source IP address or destination IP address set in the target packet is IP-3, the target packet is excluded from packets to be discarded.

The discarding requirement is a requirement in which a target packet is not excluded from packets to be discarded. In this example, in the discarding requirement, an IP address of a communication destination is IP-2 or IP-4. Specifically, a source IP address or destination IP address set in the target packet is either IP-2 or IP-4, the target packet is not excluded from packets to be discarded.

Figure 33:
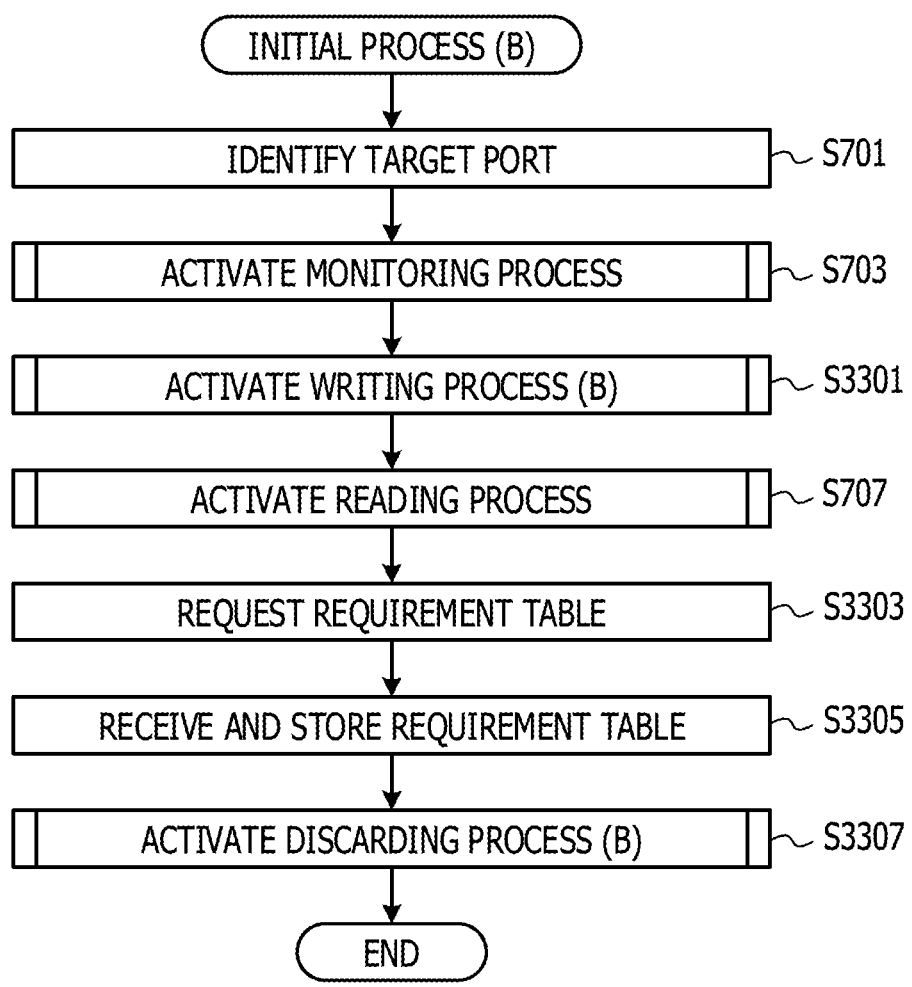
FIG. 33 is a diagram illustrating the flow of an initial process (B)

In the second embodiment, an initial process (B) is executed instead of the initial process (A). FIG. 33 illustrates the flow of the initial process (B). Processes of S701 and S703 included in the initial process (B) are the same as or similar to those included in the initial process (A).

The activator 609 activates a writing process (B) to be executed by the writer 623 (in S3301). In this example, the writing process (B) is executed as an independent process.

Figure 34:
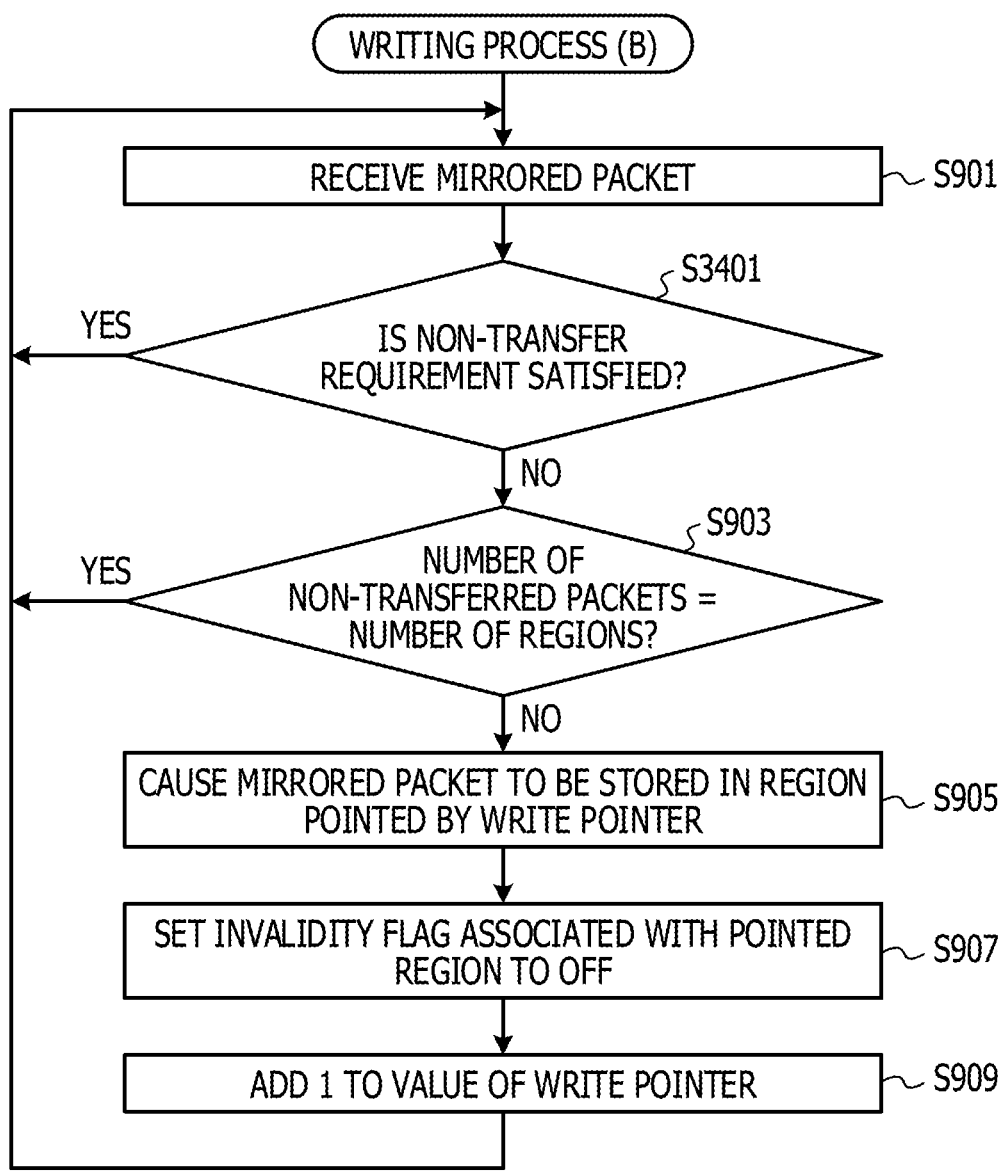
FIG. 34 is a diagram illustrating the flow of a writing process (B)

FIG. 34 illustrates the flow of the writing process (B). A process of S901 included in the writing process (B) is the same as or similar to that included in the writing process (A).

The writer 623 determines whether or not a mirrored packet satisfies the non-transfer requirement (in S3401). In this example, the writer 623 determines whether or not a protocol set in the mirrored packet is the ICMP.

When the writer 623 determines that the mirrored packet satisfies the non-transfer requirement, or when the writer 623 determines that the protocol set in the mirrored packet is the ICMP in this example, the writing process (B) returns to the process indicated by S901 so that the aforementioned processes are repeatedly executed.

On the other hand, when the writer 623 determines that the mirrored packet does not satisfy the non-transfer requirement, or when the writer 623 determines that the protocol set in the mirrored packet is not the ICMP in this example, the writing process (B) proceeds to a process of S903.

Processes of S903 to S909 included in the writing process (B) are the same as or similar to those included in the writing process (A). Then, the writing process (B) is terminated and returns to the initial process (B) that is a source of calling the writing process (B).

Return to the description of FIG. 33. A process of S707 included in the initial process (B) is the same as or similar to that included in the initial process (A).

The acquirer 611 requests the diagnosing section 113 to transmit the requirement table (in S3303). Then, the acquirer 611 receives the requirement table via the receiver 601 and causes the received requirement table to be stored in the requirement table storage section 645 (in S3305).

Figure 35:
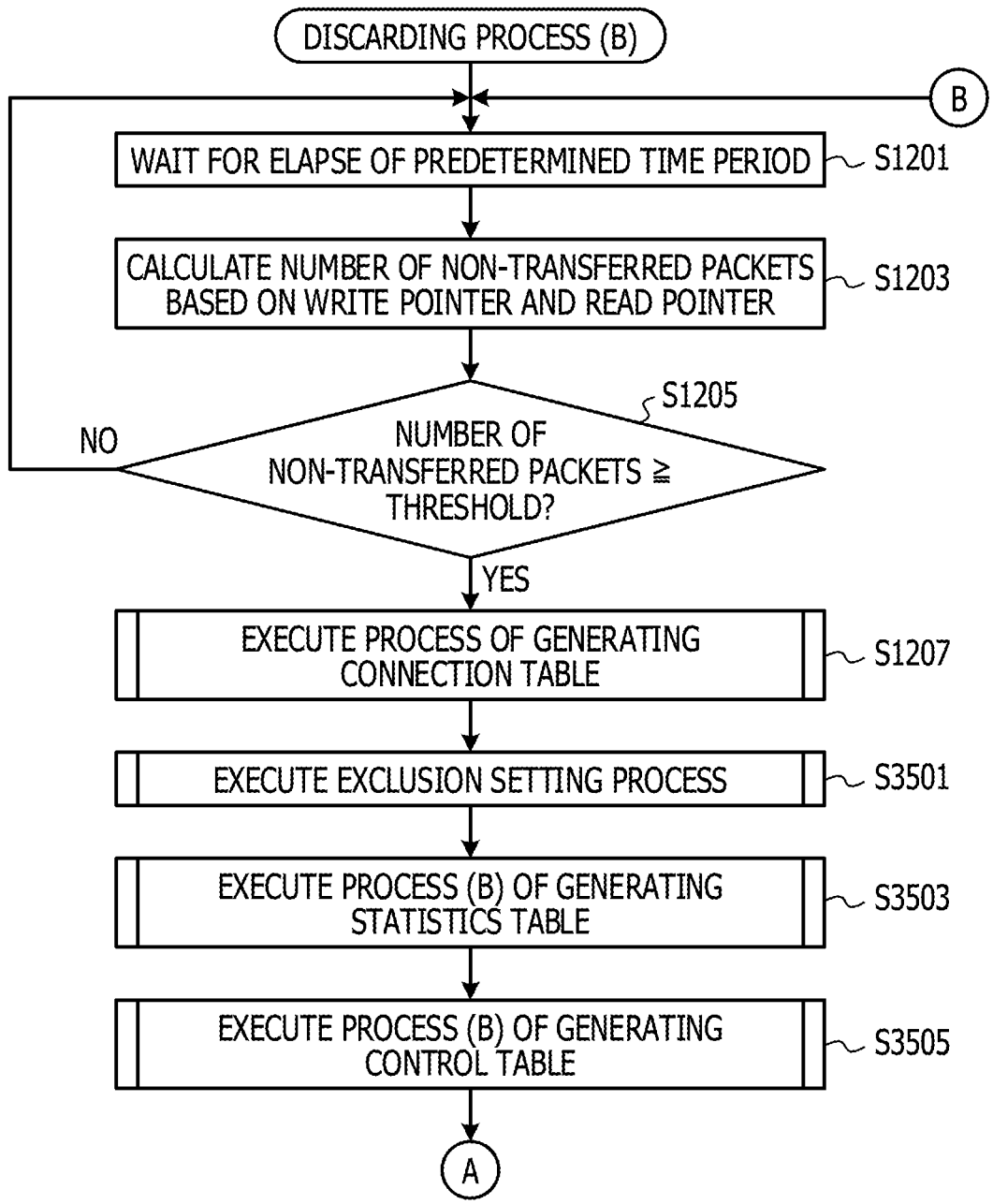
FIG. 35 is a diagram illustrating the flow of a discarding process (B)

The activator 609 activates a discarding process (B) to be executed by the discarding section 627 (in S3307). In this example, the discarding process (B) is executed as an independent process. FIG. 35 illustrates the flow of the discarding process (B).

Processes of S1201 to S1207 included in the discarding process (B) are the same as or similar to those included in the discarding process (A).

The discarding section 627 executes an exclusion setting process (in S3501). In the exclusion setting process, the discarding section 627 sets, based on the non-discarding requirement and the discarding requirement, flags to exclude one or more connections from connections to be subjected to the discarding process (B).

FIG. 36 illustrates an example of a connection table according to the second embodiment. Records of the connection table according to the second embodiment further include a field for exclusion flags. When an exclusion flag for a connection indicates ON, the exclusion flag indicates that a non-transferred packet related to the connection is excluded from packets to be discarded. When the exclusion flag for the connection indicates OFF, the non-transferred packet related to the connection is not excluded from packets to be discarded.

The example illustrated in FIG. 36 indicates that non-transferred packets related to connections having connection IDs of C3 and C4 are excluded from packets to be discarded.

Figure 37:
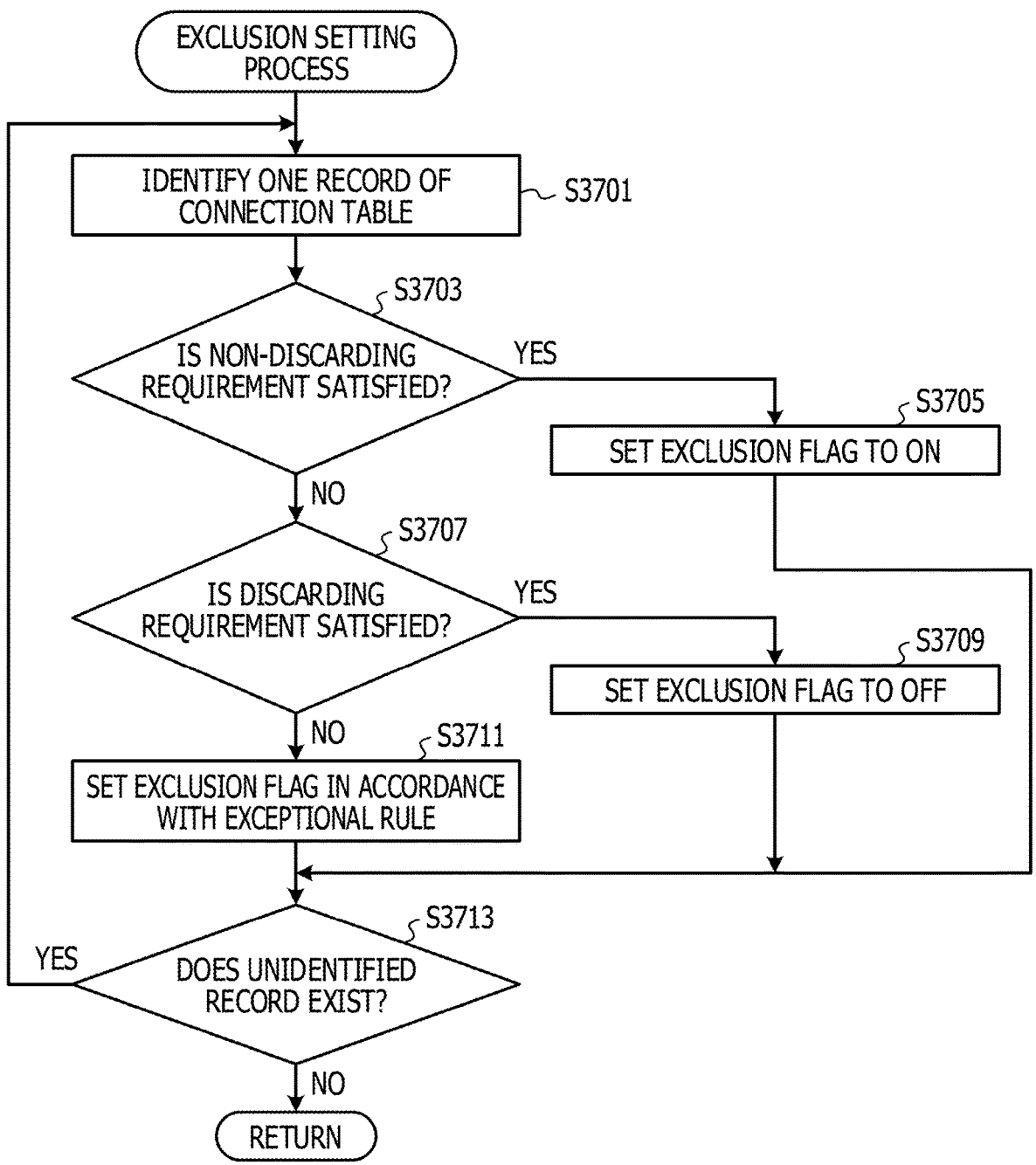
FIG. 37 is a diagram illustrating the flow of an exclusion setting process.

FIG. 37 illustrates the flow of the exclusion setting process. The discarding section 627 identifies one record of the connection table (in S3701). For example, the discarding section 627 identifies one record of the connection table in order.

The discarding section 627 determines whether or not a detail set in the identified record satisfies the non-discarding requirement (in S3703). In this example, the discarding section 627 determines whether or not a source IP address or destination IP address set in the identified record is IP-3.

When the discarding section 627 determines that the detail set in the identified record satisfies the non-discarding requirement, or when the discarding section 627 determines that the source IP address or destination IP address set in the identified record is IP-3 in this example, the discarding section 627 sets an exclusion flag included in the identified record to ON (in S3705). Then, the exclusion setting process proceeds to a process of S3713.

On the other hand, when the discarding section 627 determines that the detail set in the identified record does not satisfy the non-discarding requirement, or when the discarding section 627 determines that the source IP address or destination IP address set in the identified record is not IP-3 in this example, the discarding section 627 determines whether or not the detail set in the identified record satisfies the discarding requirement (in S3707). In this example, the discarding section 627 determines whether the source IP address or destination IP address set in the identified record is either IP-2 or IP-4.

When the discarding section 627 determines that the detail set in the identified record satisfies the discarding requirement, or when the discarding section 627 determines that the source IP address or destination IP address set in the identified record is IP-2 or IP-4 in this example, the discarding section 627 sets the exclusion flag included in the identified record to OFF (in S3709).

This example assumes that each of connections satisfies the non-discarding requirement or the discarding requirement. A connection that does not satisfy any of the discarding requirement and the discarding requirement complies with a predetermined exceptional rule. Thus, when the discarding section 627 determines that the detail set in the identified record does not satisfy the discarding requirement, or when the discarding section 627 determines that the source IP address or destination IP address set in the identified record is not any of IP-2 and IP-4 in this example, the discarding section 627 sets the exclusion flag in accordance with the exceptional rule (in S3711).

The discarding section 627 determines whether or not an unidentified record exists (in S3713). When the discarding section 627 determines that the unidentified record exists, the exclusion setting process returns to the process indicated by S3701 so that the aforementioned processes are repeatedly executed. On the other hand, when the discarding section 627 determines that the unidentified record does not exist, the exclusion setting process is terminated and returns to the discarding process (B) that is a source of calling the exclusion setting process.

As illustrated in FIG. 35, the discarding process 627 executes a process (B) of generating the statistics table (in S3503).

Figure 38:
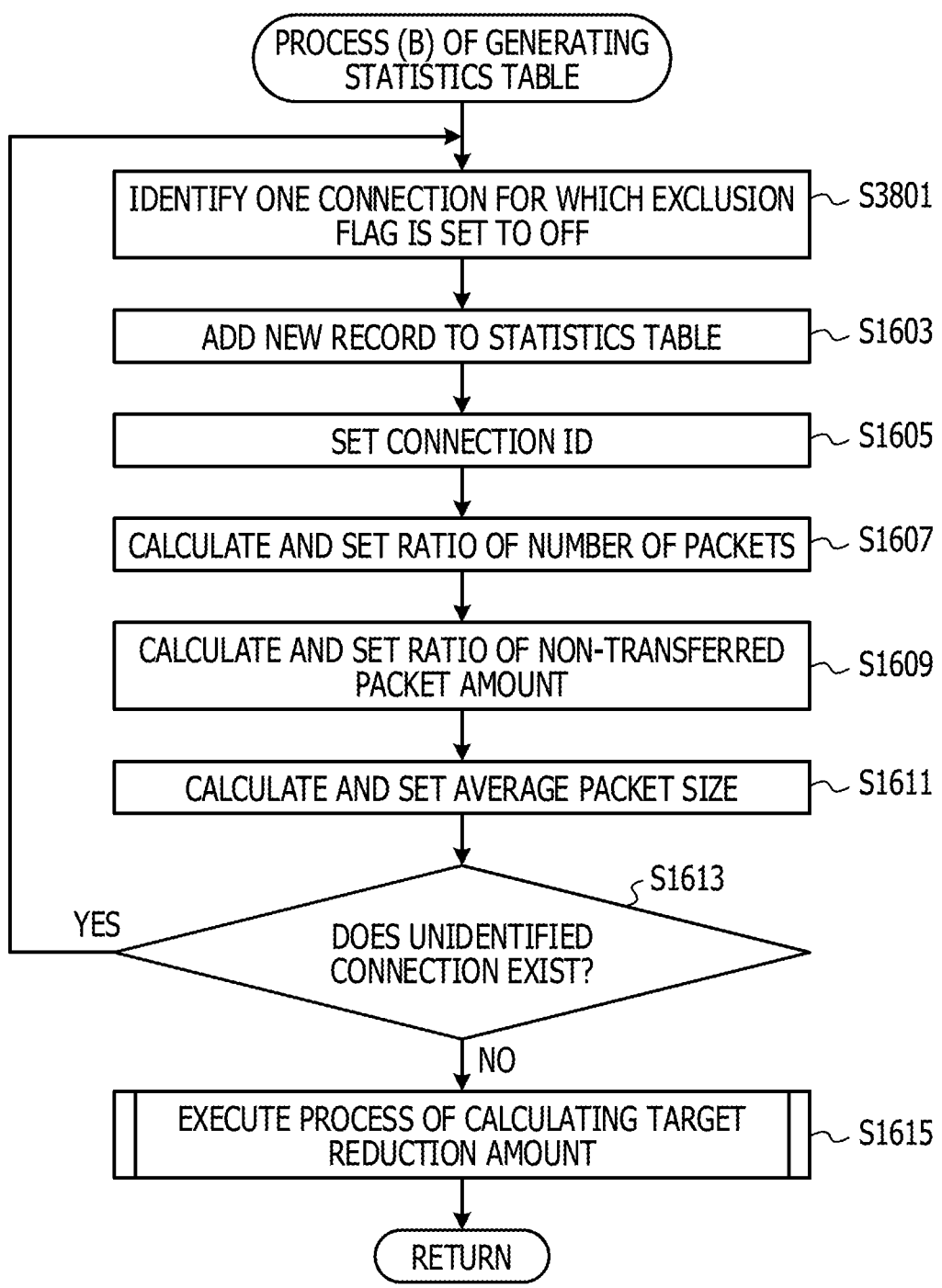
FIG. 38 is a diagram illustrating the flow of a process (B) of generating a statistics table.

FIG. 38 illustrates the flow of the process (B) of generating the statistics table. The discarding section 627 identifies one connection for which an exclusion flag is set to OFF in the connection table (in S3801).

Processes of S1603 to S1615 included in the process (B) of generating the statistics table are the same as or similar to those included in the process (A) of generating the statistics table.

After the process (B) of generating the statistics table is terminated, the process (B) of generating the statistics table returns to the discarding process (B) that is a source of calling the process (B) of generating the statistics table.

Figure 39:
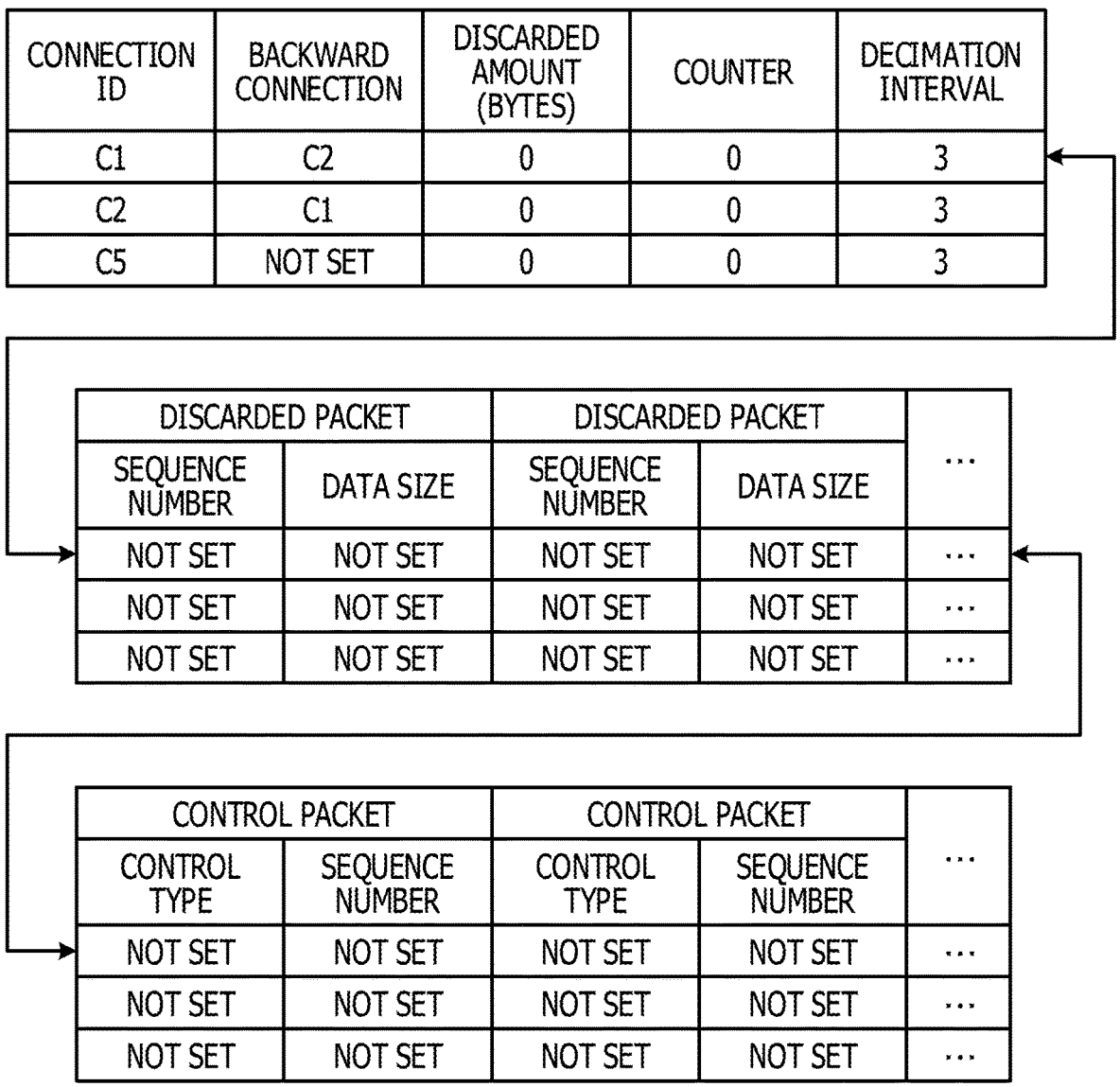
FIG. 39 is a diagram illustrating an example of a control table according to the second embodiment.

FIG. 39 illustrates an example of a control table according to the second embodiment. In this example, records for connection IDs of C3 and C4 are not generated.

Next, the discarding section 627 executes a process (B) of generating the control table (in S3505).

Figure 40:
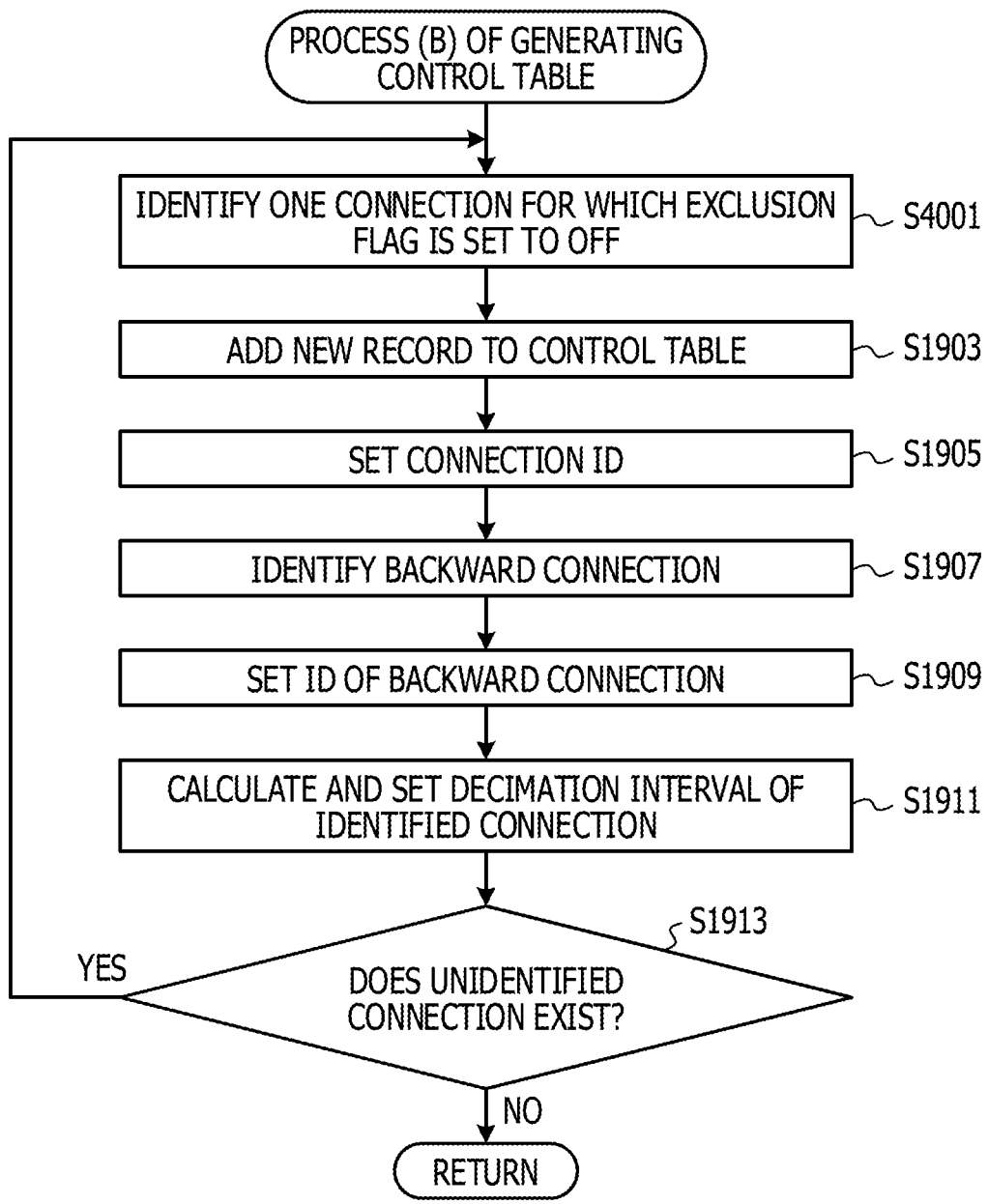
FIG. 40 is a diagram illustrating the flow of a process (B) of generating the control table.

FIG. 40 illustrates the flow of the process (B) of generating the control table. The discarding section 627 identifies one connection for which an exclusion flag is set to OFF in the connection table (in S4001).

Processes of S1903 to S1913 included in the process (B) of generating the control table are the same as or similar to those included in the process (A) of generating the control table. After the process (B) of generating the control table is terminated, the process (B) of generating the control table returns to the discarding process (B) that is a source of calling the process (B) of generating the control table.

FIG. 41 illustrates an example of the statistics table according to the second embodiment. In this example, records for the connection IDs of C3 and C4 are not generated.

Return to the description of FIG. 35. The discarding process (B) proceeds to the process of S2001 illustrated in FIG. 20 via terminal A.

The process of S2001 illustrated in FIG. 20 is the same as or similar to that included in the discarding process (A).

Figure 42:
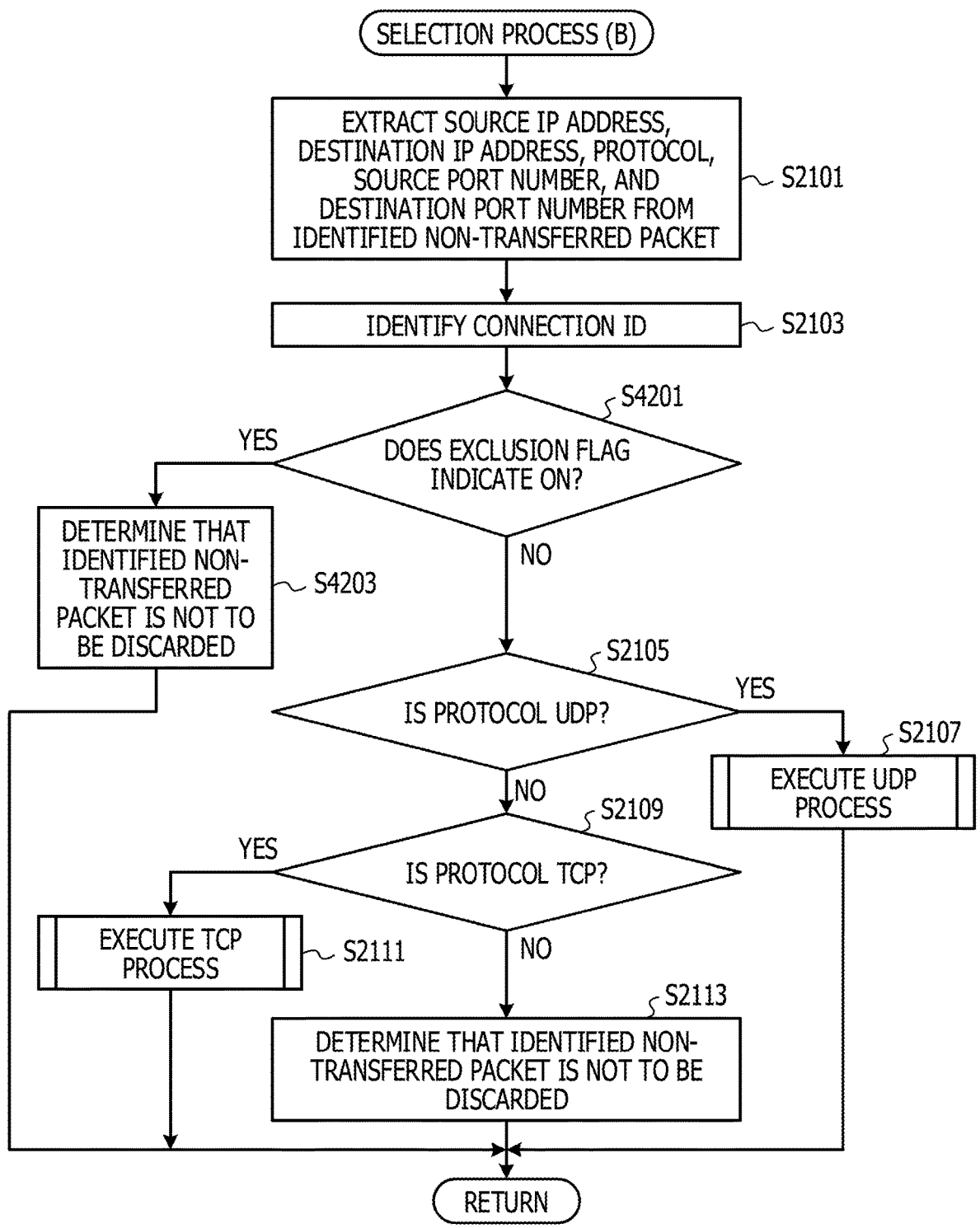
FIG. 42 is a diagram illustrating the flow of a selection process (B)

In the second embodiment, in S2003, a selection process (B) is executed instead of the selection process (A). FIG. 42 illustrates the flow of the selection process (B). Processes of S2101 and S2103 included in the selection process (B) are the same as or similar to those included in the selection process (A).

The discarding section 627 determines whether or not an exclusion flag associated with the connection ID identified in S2103 indicates ON (in S4201). When the discarding section 627 determines that the exclusion flag associated with the connection ID indicates ON, the discarding section 627 determines that the identified non-transferred packet is not to be discarded (in S4203). Then, the selection process (B) is terminated and returns to the discarding process (B) that is a source of calling the selection process (B).

On the other hand, when the discarding section 627 determines that the exclusion flag associated with the connection ID does not indicate ON or indicates OFF, the selection process (B) proceeds to a process of S2105. Processes of S2105 to S2113 included in the selection process (B) are the same as or similar to those included in the selection process (A). After the selection process (B) is terminated, the selection process (B) returns to the discarding process (B) that is the source of calling the selection process (B).

According to the second embodiment, it may be possible to inhibit the loss of a packet related to a connection to be subjected to the L7 diagnosis in which the loss of a packet is not allowed, for example.

Although the examples of the port monitoring section 111 included in the virtual switch 107a are described above, the port monitoring section 111 included in a physical switch device may be applied to the second embodiment.

In addition, during the execution of the processes of generating the tables and the execution of the selection processes in the discarding processes, the reading process may be interrupted. By executing this, a target reduction amount may be easily achieved. However, during the interruption of the reading process, a packet is not transferred.

Specifically, a read lock flag is stored in the internal parameter storage section 643. In the first embodiment, after the process of S1205 (illustrated in FIG. 12) included in the discarding process (A), the discarding section 627 sets the read lock flag to ON. After the process of S2009 (illustrated in FIG. 20), the discarding section 627 sets the read lock flag to OFF. After the process of S1101 (illustrated in FIG. 11) included in the reading process, the reader 625 determines whether or not the read lock flag indicates ON. When the read lock flag indicates ON, the process returns to the process of S1101. When the read lock flag does not indicate ON, the process returns to the process of S1103.

In the second embodiment, after the process of S1205 (illustrated in FIG. 35) included in the discarding process (B), the discarding process 627 sets the read lock flag to ON. After the process of S2009 (illustrated in FIG. 20), the discarding section 627 sets the read lock flag to OFF. After the process of S1101 (illustrated in FIG. 11) included in the reading process, the reader 625 determines whether or not the read lock flag indicates ON. When the read lock flag indicates ON, the process returns to the process of S1101. When the read lock flag does not indicate ON, the process returns to S1103.

Although the embodiments are described above, the present disclosure is not limited to this. For example, the aforementioned functional block configurations may not match program module configurations.

The configurations of the aforementioned storage regions are an example, and the storage regions may not be configured as described above. In the process flows, the order that the processes are executed may be changed or two or more of the processes may be executed in parallel as long as the process results do not change.

The aforementioned physical server device 103 is a computer device. As illustrated in FIG. 43, in the physical server device 103, a memory 2501, the CPU 2503, a hard disk drive (HDD) 2505, a display controller 2507 connected to a display device 2509, a driving device 2513 for a removable disk 2511, an input device 2515, and a communication controller 2517 to be connected to a network are connected to each other via a bus 2519. An operating system (OS) and an application program for executing the processes described in the embodiments are stored in the HDD 2505. The OS and the application program are read from the HDD 2505 into the memory 2501 and executed by the CPU 2503. The CPU 2503 controls the display controller 2507, the communication controller 2517, and the driving device 2513 to cause the display controller 2507, the communication controller 2517, and the driving device 2513 to execute predetermined operations based on processing contents of the application program. In addition, data that is being processed is stored mainly in the memory 2501, but may be stored in the HDD 2505. In the embodiments, the application program for executing the aforementioned processes is stored and distributed in the computer-readable removable disk 2511 and installed in the HDD 2505 from the driving device 2513. The application program may be installed in the HDD 2505 via the network such as the Internet and the communication controller 2517. This computer device enables the aforementioned various functions by causing hardware including the memory 2501 and programs including the OS and the application program to closely collaborate with each other.

The aforementioned embodiments are summarized as follows.

Each of the packet control methods described in the embodiments includes (A) a process of writing, to the buffer, a packet obtained by copying a packet being transmitted, (B) a process of reading, from the buffer, a packet to be transferred to a device whose communication state is to be diagnosed, and (C) a discarding process of selecting a control packet to be subjected to a connection procedure and a disconnection procedure in a predetermined protocol and discarding one or more non-transferred packets other than the selected control packet.

In this case, it may be possible to inhibit the loss of a packet important for the diagnosis of a communication state. Especially, it is useful to identify a connection period in the predetermined protocol.

In the aforementioned discarding processes, when a certain packet including body data is discarded, a response packet to the certain packet may be selected and may not be discarded.

In this case, it is useful to identify the amount of data to be transmitted.

In the aforementioned discarding processes, a non-transferred packet related to a connection identified based on a requirement related to a source or destination of a packet may not be discarded.

In this case, for example, it may be possible to inhibit the loss of a packet related to a connection that is to be analyzed and in which the loss of a packet is not allowed.

A program for causing a computer to execute the processes according to in the aforementioned methods may be generated and stored in a computer-readable storage medium or storage device such as a flexible disk, a CD-ROM, a magneto-optical disc, a semiconductor memory, or a hard disk. Intermediate results of the processes are temporarily stored in a storage device such as a main memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
    writing, to a memory, a plurality of mirrored packets respectively obtained by copying a packet being transmitted;
    reading, from among the plurality of mirrored packets stored in the memory, one or more mirrored packets to be transferred to a device that diagnoses a communication state;
    selecting, from non-transferred packets which are not transferred to the device among the plurality of mirrored packets stored in the memory, one or more control packets to be transmitted during executing at least one of a connection procedure and a disconnection procedure in a predetermined protocol; and
    discarding, from the memory, one or more packets other than the one or more selected control packets.

2. The non-transitory computer-readable storage medium according to claim 1, wherein the process further comprises:
    when a certain packet including body data is discarded, selecting, from the non-transferred packets stored in the memory, a response packet to the certain packet;
    preventing the response packet from the discarding.

3. The non-transitory computer-readable storage medium according to claim 1, wherein the process further comprises:
    preventing one or more packets related to a connection identified based on a requirement regarding a source or destination from the discarding.

4. A packet control method executed by a computer, the packet control method comprising:
    writing, to a memory, a plurality of mirrored packets respectively obtained by copying a packet being transmitted;
    reading, from among the plurality of mirrored packets stored in the memory, one or more mirrored packets to be transferred to a device that diagnoses a communication state;
    selecting, from non-transferred packets which are not transferred to the device among the plurality of mirrored packets stored in the memory, one or more control packets to be transmitted during executing at least one of a connection procedure and a disconnection procedure in a predetermined protocol; and
    discarding, from the memory, one or more packets other than the one or more selected control packets.

5. A packet control device comprising:
    a memory; and
    a processor coupled to the memory and the processor configured to execute a process, the process including:
        writing, to a memory, a plurality of mirrored packets respectively obtained by copying a packet being transmitted;
        reading, from among the plurality of mirrored packets stored in the memory, one or more mirrored packets to be transferred to a device that diagnoses a communication state;
        selecting, from non-transferred packets which are not transferred to the device among the plurality of mirrored packets stored in the memory, one or more control packets to be transmitted during executing at least one of a connection procedure and a disconnection procedure in a predetermined protocol; and discarding, from the memory, one or more packets other than the one or more selected control packets.

6. The packet control method according to claim 4, further comprising:

when a certain packet including body data is discarded, selecting, from the non-transferred packets stored in the memory, a response packet to the certain packet;

preventing the response packet from the discarding.

7. The packet control device according to claim 5, wherein the process further comprises:

when a certain packet including body data is discarded, selecting, from the non-transferred packets stored in the memory, a response packet to the certain packet; and preventing the response packet from the discarding.

* * * * *